United States Patent Office 3,391,107
Patented July 2, 1968

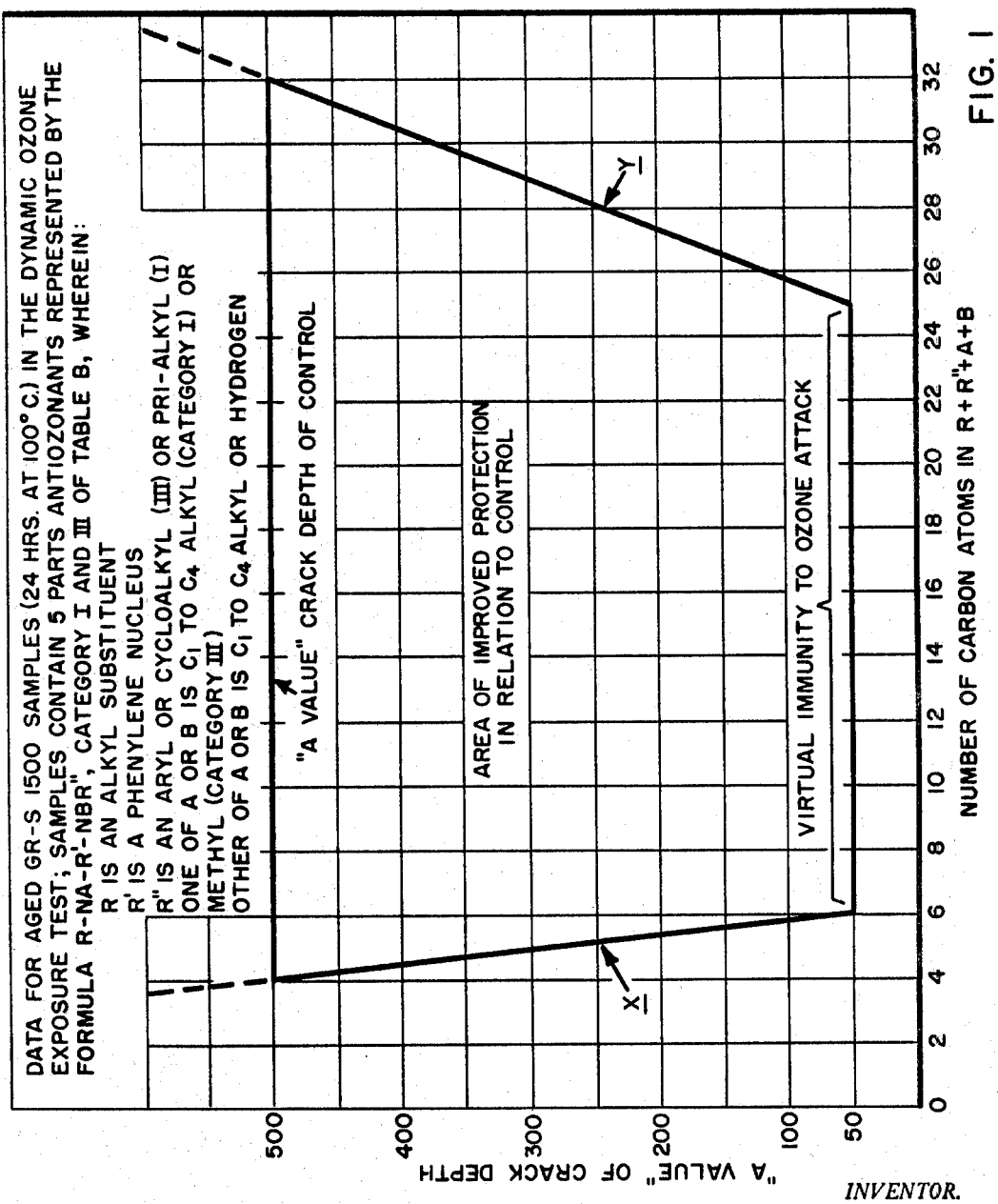

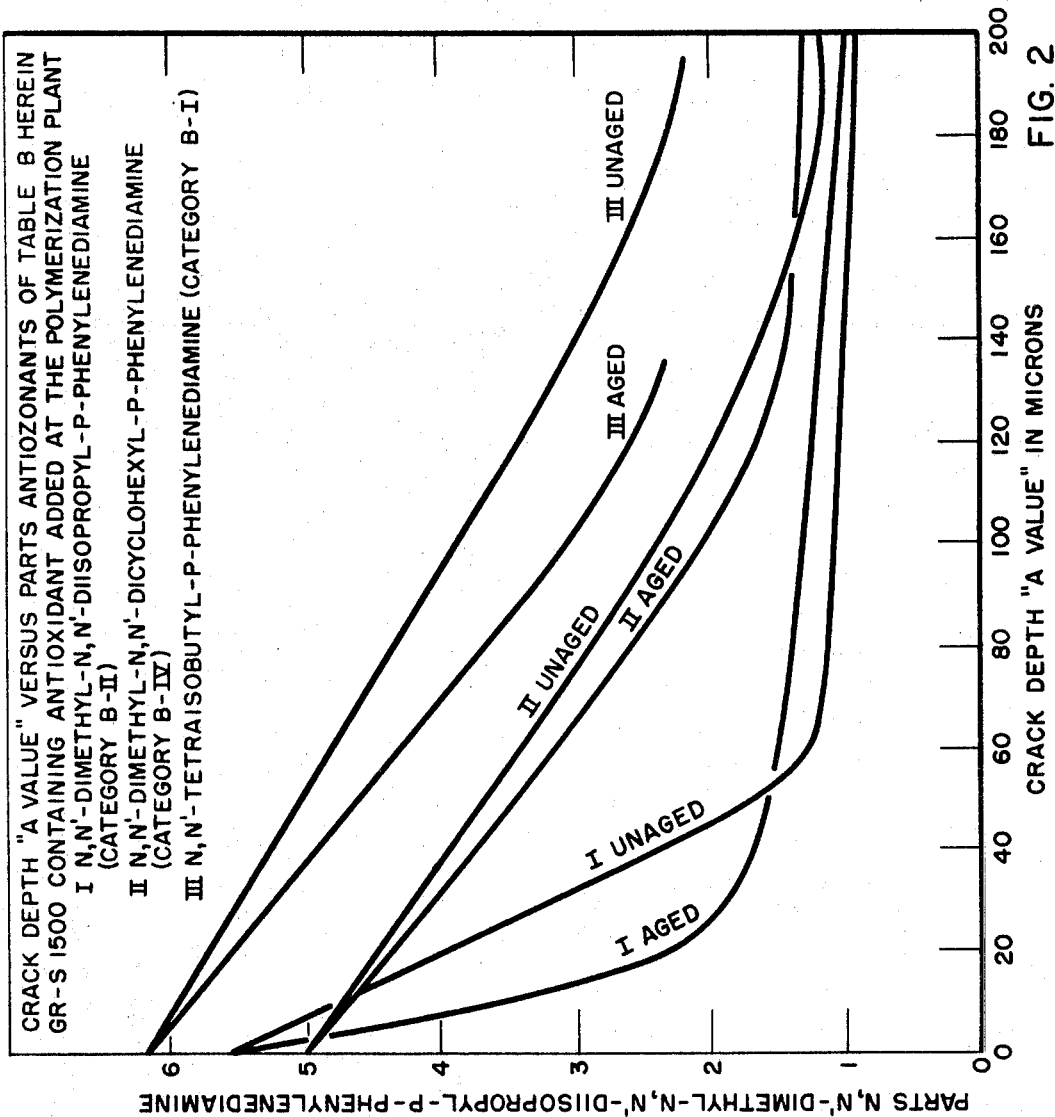

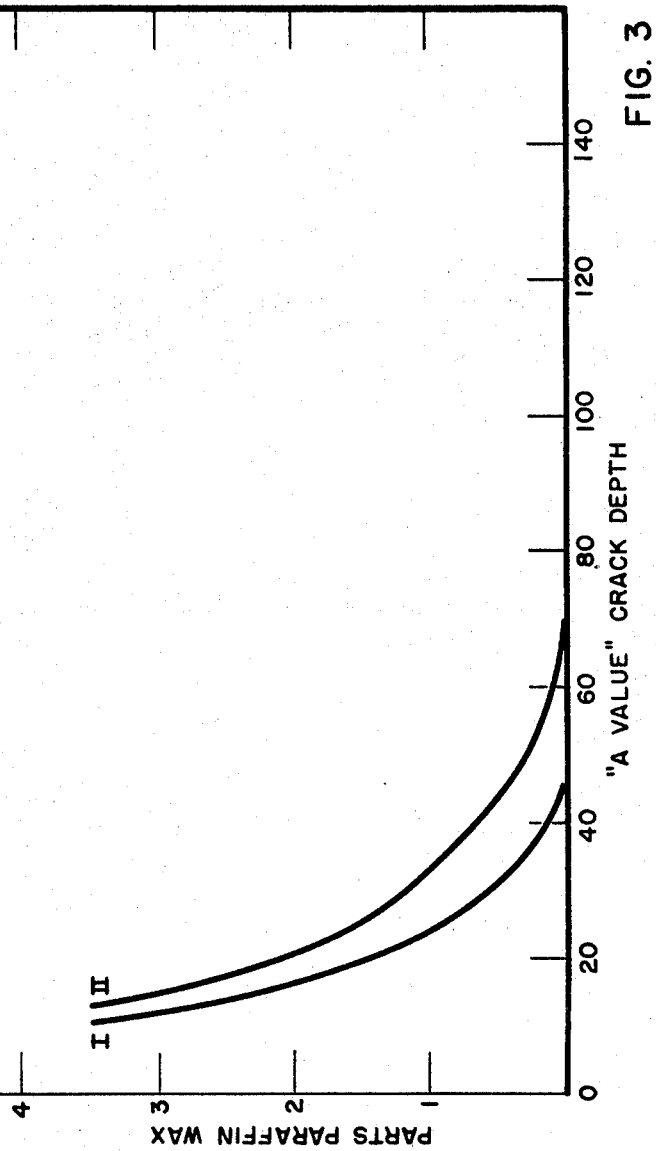

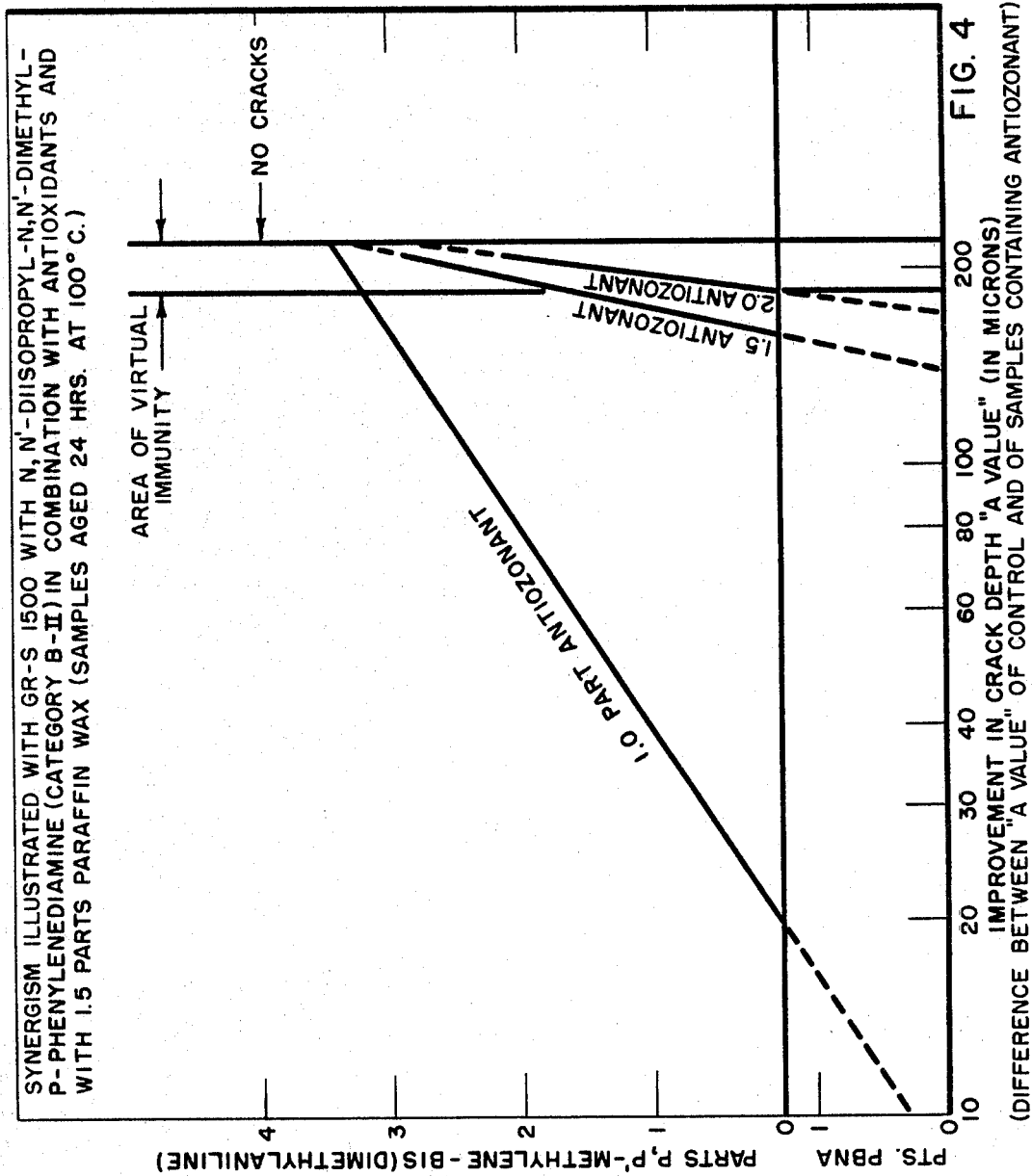

3,391,107
ANTIOZONANTS AND ANTIOZONANT COM-
POSITIONS FOR ELASTOMERS
Eldon E. Stahly, Birmingham, Mich., assignor, by direct
and mesne assignments, of three-fourths percent to
Oliver W. Burke, Jr., Grosse Pointe, Mich., and one-
fourth percent to Eastman Kodak Company, Rochester,
N.Y., a corporation of New Jersey
Filed Feb. 15, 1957, Ser. No. 640,542
4 Claims. (Cl. 260—45.9)

The present invention relates to antiozonants for high polymers per se subject to ozone attack, especially vulcanizable elastomers including the natural rubbers, synthetic elastomers such as polybutadiene, GR-S type synthetic rubbers, other diene vinyl copolymers such as acrylonitrile-butadiene elastomers, etc., and in addition the non-vulcanizable elastomers, plastomers and resins, particularly those which have residual unsaturation, and aims generally to improve the same.

The present application is a continuation-in-part of U.S. application S.N. 606,767 now U.S. Patent No. 3,157,615. The invention claimed in said copending U.S. application S.N. 606,767 includes the class of substituted para-phenylenediamine antiozonants for elastomeric material set forth in Table A (duplicated herein), synergistic antiozonant combinations thereof with either wax or antioxidant materials or with both, the incorporation of said antiozonants and synergistic combinations in elastomers, the improved products resulting therefrom, and the new chemical compounds therein disclosed.

The antioxonants of the invention of said copending U.S. application also exhibit synergism with certain heavy metal soaps, as discovered jointly by applicant and R. G. Spain and set forth in copending joint U.S. application S.N. 523,711, filed July 22, 1955, now abandoned. The parent compounds of certain of the new antiozonants of said Table A have been disclosed in said copending joint application and in sole U.S. applications S.N. 607,318, filed Aug. 31, 1956, now U.S. Patent No. 3,163,616, and S.N. 610,819, filed Sept. 19, 1956 now abandoned. Particular classes of derivatives of such parent compounds and combinations thereof with elastomers, per se, and in synergism with wax and/or antioxidant are claimed in U.S. application S.N. 606,767 and the present invention.

The present application discloses a specific class of antiozonants, set forth in Table B herein, which lie outside the categories claimed in U.S. application S.N. 606,767 now U.S. Patent No. 3,157,615 and which show certain more specific advantages.

The compounds of Table A and Table B conform to the same general formulation RNA—R'—NBR'', wherein R' in both tables is an arylene radical as defined and the groups R, R'', A and B are differently defined in Tables A and B. In the last mentioned table (representing compounds of the present invention) the second of A and B (fourth column of Table B) is methyl for Categories II, III and IV, and is an alkyl radical comprising 1 to 4 carbon atoms in Categories I, V and VI or may be a polar group, as defined, in Categories V and VI; the first of A and B (second column of Table B) may be a low carbon count alkyl, hydrogen, or a polar group as defined in Table B; R' is arylene and R'' is a hydrocarbon radical; while R is a hydrocarbon radical or a polar radical as shown in Table B.

The compounds defined in Table A were discussed in U.S. application S.N. 606,767 now U.S. Patent No. 3,157,615 and are not further defined herein since the differences between the compounds of the two tables (i.e., Tables A and B) are readily apparent both with regard to R and R'', A and B and limitations of carbon count of the antiozonant.

PROLOGUE AND OBJECTS

It is well known that many compounds possess the property of preserving rubber, when incorporated therein, against the superficial hardening and crazing resulting from attack by oxygen, light and heat. Such compounds are termed "antioxidants." However, as pointed out in said copending joint application, the previously known antioxidants have not been effective to guard against the distinctly different effects of ozone on such materials, of which the generation of deep penetrating cracks is characteristic.

It has long been recognized that a solution of the problem of ozone attack on both natural and synthetic rubber goods is greatly needed and that reduction of ozone attack or freeing of such goods from ozone attack is of high importance. Indeed, as early as 1944 the ASTM prescribed a testing procedure for measuring ozone attack in connection with essentially *static* goods, such as refrigerator gaskets, windshield mountings and the like.

It has more recently been recognized that when *dynamically flexed* rubber goods, such as tires, are made in the usual way with or without antioxidants, such articles are subject to deterioration by ozone attack, whether in continuous or intermittent use or storage.

As above noted, attack by ozone on statically or dynamically employed rubber goods becomes apparent by the development of penetrating cracks which progressively become deeper with time of exposure to the atmosphere, which practically always contains ozone in trace amounts. Such cracks in tires often become sufficiently deep to cause failure. Indeed, in the case of new tires stored for substantial periods, such cracks may cause failure within a relatively short time after the tires are put into use. This result of ozone attack is thus quite distinct from the development of fine surface cracks, i.e., checking and crazing, attributed to oxidative deterioration.

Ozone attack is extremely bad in areas indigent to cities such as Los Angeles, Calif., where smog conditions are associated with high ozone concentration, e.g., from 10 parts to 60 parts per hundred million in Los Angeles and similar high-ozone areas so-called ozone cracks may develop in rubber articles such as tires, in less than a month of storage time. In areas such as Detroit, Mich., the normal ozone concentration in the air is less than 5 parts per hundred million, and ozone cracks may not develop for several months.

In any event ozone-cracking is recognized as one of the heretofore important unsolved problems in storage and use of articles containing natural or synthetic rubber components, and the inventions in said copending applications, and herein aim to provide solutions for that problem, especially with respect to elastomers employed in dynamic usage.

For many years the rubber industry has employed chemicals such as Santoflex AW (the trade name for 6-ethoxy-2,2,4-trimethyl-1,2-dihydroquinoline) in rubber articles to protect the same against oxidation on aging. From a survey of chemicals used to protect the products of representative manufacturers of rubber goods, it appears that Santoflex AW had been widely accepted and used as one of the best materials available for that purpose. Accordingly, to demonstrate the ozone resistance afforded by new antiozonants, a GR-S compound, containing Santoflex AW, was compared with GR-S containing other antioxidant materials to demonstrate which of such materials seemed the most resistant to ozone attack under both static and dynamic conditions after subjecting to heat aging conditions, and since the Santoflex AW seemed to be the best of the materials so compared, though itself affording no adequate proptection of elastomers against ozone attack, it was used as a standard for comparison to evaluate the improved resistance to such attacks imparted by new and synergistic antiozonant compositions (see Table I of copending joint application S.N. 523,711, filed July 22, 1955). In spite of the accepted usage of Santoflex AW in the industry it will be noted from the tables hereinafter, in which this material is used as control, that relatively little protection of elastomers against ozone cracking is afforded by Santoflex AW as compared to the antiozonants of the present invention, particularly after the samples had been heat-aged to simulate the conditions accompanying subjection of the elastomers of dynamic usage.

A desirable property in case of antiozonants, as in the case of any other additives to rubber, is inertness with respect to the curing ingredients of the elastomer compound. The vulcanized compounds after exposure to heat-aging (24 hours at 100° C. is taken as an exacting standard herein) should still show from about 275% to 375%, or greater, elongation to be suitable for tire stocks. Original and heat-aged stress-strain properties were therefore both obtained to demonstrate that normal vulcanizations are obtainable with the antiozonants incorporated in the elastomer compounds. For the sake of brevity, the tensile properties have been omitted from the table wherein the samples showed the physical properties required of the elastomer stocks. Certain compounds including benzidine resulted in a very short stock after aging (see Examples F-2, F-3 and G-2, Table I of copending joint application); while protection against ozone was good, such additives caused overcuring, thus rendering them unsuitable for use in GR–S stocks for manufacture of tires and many other articles of commerce. Antiozonants of said joint application do accelerate the elastomer vulcanization rate but are usable by an adjustment of the conventional curing recipes in practical application.

A further desirable property of antiozonants as well as of any other additives is inertness with respect to development of color and stain in light colored elastomer compounds. Those additives which develop dark colors are less desirable, e.g., in elastomers which are to be employed in construction of white sidewall tires.

Thus, principal objects of the present invention are the provisions of (1) new antiozonants or chemical compounds for incorporation into elastomer and plastomer compositions which alone will effectively protect same against ozone cracking, especially after heat-aging, (2) synergistic combinations of two or more said new antiozonants as well as synergistic combinations of said new antiozonants with known antiozonants and/or antioxidants for rubber and/or waxes which, with or without further synergistic combination with heavy metal soaps, will effectively protect the same against ozone cracking, especially after aging or heat-aging, without deleteriously altering the physical properties of the protected materials, (3) autiozonants which have low effect on the vulcanization rate of the elastomers incorporating them, (4) antiozonants which are low in staining characteristics, (5) new methods of protecting elastomers and plastomers from ozone attack characterized by the use of such new materials, (6) elastomer and plastomer articles including such chemicals and rendered ozone resistant thereby. Other objects and advantages of the invention will be made apparent from more detailed description and examples of its application.

The invention of the present application resides in the new class of antiozonants and the novel compounds of such class herein disclosed, the synergistic combinations thereof with antioxidants and/or waxes with or without the added synergism with heavy metal soaps, the methods of applying said new antiozonants and synergistic combinations, and the improved products containing the same. This invention thus comprises, inter alia, (1) a class of the new and useful antiozonants for rubber conforming to the formula R—NA—R'—NB—R" wherein one of A and B is $C_1$ to $C_4$ alkyl or hydrogen, or a polar substituent when the other of A and B is a methyl group, or, in certain categories (see Table B), may be a $C_1$ to $C_4$ alkyl group and in Categories V and VI may be a polar group as designated, and wherein R, R' and R" are as shown in the six categories of Table B and the total carbon counts of the members of the new class are subject to the restrictions and limitations therein set forth, and (2) the said new antiozonants that are new and previously unknown chemical compounds, per se, and hence patentable as such, that fall into the general class and categories set forth in Table B but exclude the members of Category I in which R, R", A and B are identical $C_1$ to $C_3$ primary alkyl groups, and which are subject to the restrictions and limitations therein set forth, as will be apparent from the following detailed descriptions and examples, which are to be taken as illustrative and not restrictive of the invention, the scope of which is more particularly pointed out in the appended claims. While the several categories and species of the inventions have certain characteristics in common that justify considering them as parts of a generic group, it will be obvious from the following detailed description that the categories and species differ from each other and therefore are not necessarily equivalents except in such broad sense.

It is evident that the materials of Tables A and B are all derivatives of mono- and di-arylene diamines, which in all cases have at least three nitrogen substituent radicals. The alkyl substituents A and/or B may be introduced into the parent N,N'-disubstituted amines by reacting the latter with appropriate reagents as hereinafter described, or in other ways.

Derivatives found in which A and/or B are other than hydrogen have definite advantages over the parent compound, for example, advantages in scorch time and/or aging characteristics of the elastomer compounds in which the said antiozonant is incorporated, advantages in decreased tendency to color or stain light colored elastomer stocks, or in other characteristics.

Also, while for greater antiozonant activity, it is preferred that R' be an unsubstituted or hydrocarbon substituted phenylene radical, within the broader aspects of the invention (see Table B), diphenylene radicals selected from the group consisting of biphenylene, methylenediphenylene, and iminodiphenylene, unsubstituted and hydrocarbon substituted, may be employed as R'. The N,N' - substituted - p - diamino - diphenylenes have been shown in the above identified joint application to have antiozonant activity; the invention of said S.N. 606,767 has shown that the derivatives of these materials corresponding to those of Table A are similarly improved by the designated substituents at A and B; and the present invention has shown that substitution of the parent compounds produces derivatives designated in Table B having certain further advantages such as in antiozone activity, low scorch and low staining characteristics.

The specific class of compounds disclosed by the present invention is represented by the formula

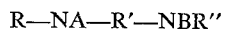

of Table B wherein one of A and B is methyl, or (in three categories) is $C_1$ to $C_4$ alkyl or (in Category V and VI) may be $C_1$ to $C_4$ alkyl or a polar group, the second of A and B is $C_1$ to $C_4$ alkyl or hydrogen, or a polar radical of the halogenoid type as listed in Table B, R'=a mono- or diphenyl nucleus, R and R"=hydrocarbon radicals selected from the classes as defined in Table B except in Category VI where R may be a polar radical as indicated and subject to the limitations on the carbon counts designated in the last column of Table B and exemplified TABLE A.—CATEGORIES OF ANTIOZONANTS ACCORDING TO THE INVENTION OF S.N. 606,767 HAVING THE GENERAL FORMULA R—NA—R'—NB—R'

| R | Either of A and B (selected from) | R' (selected from) | The Second of A and B (selected from) | R'' | Limitation—total carbons in R' plus hydrocarbon substituents R, A, B, and R'' |
|---|---|---|---|---|---|
| (I) -Pri-alkyl. | 1. Non-Polar:<br>  (a) Hydrogen.<br>  (b) Alkyl ($C_1$–$C_4$).<br>2. Polar:<br>  (a) Halogenoid and organo-halogenoid substituents, e.g.:<br>    (1) Nitroso-.<br>    (2) Cyano($C_1$–$C_{19}$)hydrocarbon, including $\alpha$- and $\beta$-cycloalkyl, and -cycloalkenyl substituents, per se and substituted with alkyl-, cycloalkyl-, and aryl-radicals.<br>    (3) Polycyanoalkyl polyamines, e.g., cyanohydrocarbon substituted poly(alkyleneamino)-alkyl substituents.<br>  (b) Acyl ($C_3$–$C_{20}$). | Unsubstituted or hydrocarbon substituted mono- and di-arylene nuclei. | 1. Non-Polar: -Alkyl ($C_2$–$C_4$).<br>2. Polar:<br>  (a) Halogenoid and organo-halogenoid substituents, e.g.:<br>    (1) Nitroso-.<br>    (2) Cyano($C_1$–$C_{19}$)hydrocarbon, including $\alpha$- and $\beta$-cycloalkyl, and -cycloalkenyl substituents, per se and substituted with alkyl-, cycloalkyl-, and aryl-radicals.<br>    (3) Polycyanoalkyl polyamines, e.g., cyanohydrocarbon substituted poly(alkyleneamino)-alkyl substituents.<br>  (b) Acyl ($C_3$–$C_{20}$). | -Sec-alkyl. | 15-31 |
| (II) -Alkyl. | | | | -Aryl or cycloalkyl (unsubstituted or hydrocarbon substituted). | 13-31 |
| (III) -Cycloalkyl (unsubstituted or hydrocarbon substituted). | | | | -Cycloalkyl (unsubstituted or hydrocarbon substituted). | 16-31 |
| (IV) -Sec-alkyl. | | | | -Sec-alkyl. | 12-32 |
| (V) Cycloalkyl. | | | | -Aryl. | 17-31 |

TABLE B.—CATEGORIES OF ANTIOZONANTS ACCORDING TO THE PRESENT INVENTION HAVING THE GENERAL FORMULA R—NA—R'—NBR

| R (selected from) | Either of A and B (selected from) | R' (selected from) | Other of A and B (selected from) | R'' (selected from) | Limitations of Total Carbon in Compound for Greatest Effectiveness |
|---|---|---|---|---|---|
| (I) Alkyl including hydrocarbon substituted alkyl. | 1. Non-polar:<br>  (a) Hydrogen.<br>  (b) Alkyl $C_1$–$C_4$ inclusive.<br>2. Polar:<br>  (a) Halogenoid and organo-halogenoid substituents, e.g.:<br>    (1) Nitroso-.<br>    (2) Cyano($C_1$–$C_{19}$)hydrocarbon, including $\alpha$- and $\beta$-cycloalkyl, and -cycloalkenyl substituents, per se and substituted with alkyl-, cycloalkyl-, and aryl-radicals.<br>    (3) Polycyanoalkyl polyamines, e.g., cyanohydrocarbon substituted poly(alkyleneamino)-alkyl substituents containing from 6 to 24 carbon atoms.<br>  (b) Acyl ($C_3$–$C_{20}$). | Unsubstituted or hydrocarbon substituted mono- and di-arylene nuclei. | $C_1$ to $C_4$ Alkyl. | Primary alkyl including hydrocarbon substituted primary alkyl. | 12-31 |
| (II) Alkyl or hydrocarbon substituted alkyl. | | | Methyl. | Sec-alkyl or hydrocarbon substituted sec-alkyl. | 12-23 |
| (III) Alkyl including hydrocarbon substituted alkyl. | | | Methyl. | Cyclohydrocarbon radical including unsubstituted and hydrocarbon substituted aryl, cycloalkyl, and heterocyclic. | 12-31 |
| (IV) Cycloalkyl including hydrocarbon substituted cycloalkyl. | | | Methyl. | Cycloalkyl and aryl (unsubstituted and hydrocarbon substituted). | 13-31 |
| (V) Aryl and heterocyclic and hydrocarbon substituted aryl and heterocyclic radical. | | | 1. Non-polar: $C_1$–$C_4$ alkyl.<br>2. Polar: Same as 2(a) Polar groups (2nd col.). | -Aryl and heterocyclic including hydrocarbon substituted aryl and heterocyclic. | 19-31 |
| (VI) Same as 2(a) Polar group (next column). | | | Same as Category V. | Any of above listed hydrocarbon radicals. | 11-34 | in FIGURE 1. Methylated examples of this invention may be specifically represented by:

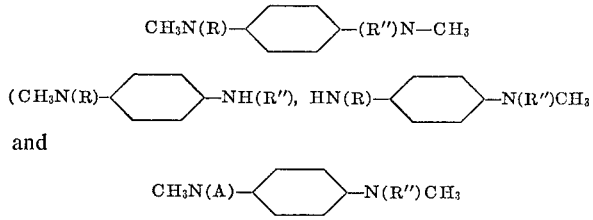

and wherein A, R and R″ are as defined in Table B. Butylated examples, ethylated and propylated examples of this invention are represented by a similar formula in which, instead of the methyl group, butyl, ethyl and propyl groups (i.e., $C_4H_9$, $C_2H_5$ and $C_3H_7$) appear, respectively. Thus the compounds of Categories II, III and IV of this invention may be N-monomethyl-, N,N′-di- and tri-hydrocarbon substituted-p-mono- and di-phenylenediamines, and in Category I the members may be N,N′-di($C_1$ to $C_4$ alkyl)-N-pri-alkyl-N′-alkyl-p-phenylenediamine and N-pri-alkyl-N′-alkyl-N- or -N′-$C_1$ to $C_4$ alkyl-p-phenylenediamine. From Table B it is also apparent that R and/or R″ as well as A and B may be $C_1$ to $C_4$ alkyl groups in certain antiozonants of Category I, so that N-monomethyl - N,N′ - trialkyl-p-phenylenediamine antiozonants having a total carbon count in the four N-substituent groups of at least 6 and not more than 17 when R′ is monophenylene, are included in this invention, as is also N,N-tetra-pri-alkyl-p-phenylenediamine (e.g., tetra-isobutyl-p-phenylenediamine). Category V includes N,N′-diaryl - N,N′ - dialkyl - p - phenylenediamines within the limitations of Table B, as well as N,N′-diaryl-N-alkyl-N′-halogenoid radical-p-phenylenediamine and N,N′diaryl-N,N′-dihalogenoid radical-p-phenylenediamine. Category VI includes N-mono- and N-di-hydrocarbon radical N′-dihalogenoid radical-p-phenylenediamines as well as certain N,N′-trihalogenoid radical-p-phenylenediamines, e.g., N-hydrocarbon - N,N′ - tri - (1 - cyanoethyl)-p-phenylenediamine, as circumscribed by the representations of Table B.

The appropriate incorporation of the new antiozonants gives virtual immunity against much higher than ordinary atmospheric concentrations of ozone to elastomer compositions even when the same have been subjected to radical heat-aging, thus showing that these antiozonants are capable of protecting the products for long periods of time under conditions of dynamic usage as well as in static usages.

In the accompanying drawings pertaining to representative categories of the invention:

FIGURES 1, 2 and 3 are illustrative charts drawn to simple coordinates.

FIGURE 4 is an illustrative chart drawn to semilogarithmic coordinates.

PREPARATION OF ANTIOZONANTS

The parent symmetrical compounds of the present invention may be prepared in a simple manner. For example one of the compounds of the above identified class may be prepared by aminative reduction of acetone with p-phenylenediamines and hydrogen; one mole $$NH_2—C_6H_4—NH_2$$

plus 2 moles acetone plus excess hydrogen with a hydrogenation catalyst, such as copper chromite or Raney nickel, under the influence of heat and pressure, produce the N,N′-diisopropyl derivatives of the diamine, namely, isopropyl - NH—$C_6H_4$—NH - isopropyl. The above reaction can be run with one mole of acetone so that the first product contains chiefly isopropyl-NH—$C_6H_4$—$NH_2$, and this product can be further treated with a second ketone, e.g., cyclohexanone or formaldehyde to effect substitution in the second amino group by cyclohexyl or methyl groups respectively, or it can be used itself as a parent mono-substituted amine for preparation of A and/or B and/or R″ substituted derivatives as described in the third paragraph following.

An advantageous method for preparation of N,N′-disubstituted p-phenylenediamine wherein the substituents are not identical depends on reaction of p-nitroaniline and a ketone. The resultant p-nitro Schiff base is hydrogenated in the presence of Raney nickel or copper chromite, for example, to produce the corresponding

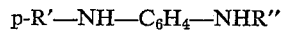

When N - phenyl - N′ - sec - alkyl - p - phenylenediamine or N - cyclohexyl - N′ - sec - alkyl - p - phenylenediamine is desired, aniline or cyclohexylamine, respectively, may be reacted with p-chloronitrobenzene to form p-nitrodiphenylamine or p-nitrophenylcyclohexylamine, respectively, which may then be reacted with ketones under hydrogenating conditions to produce the unsymmetrical antiozonants.

As an example of alkylation to produce the alkylation substitutions at A and B of the parent diamines descriptive procedures are described for the preparations of the mono- and di-methyl substituted derivatives. It should be understood that $C_2$ to $C_4$ alkyl groups may be introduced by the same general methods.

Two methyl groups may be introduced into the parent N,N′ - di - substituted p-phenylenediamine, usually as the final step, by the well known method of heating with dimethyl sulfate at about 100° C. in an appropriate solvent such as water or an aqueous dioxane solution of NaOH, the NaOH being regulated to maintain basicity. The methyl sulfate and NaOH are added gradually to the water - diamine mixture or dioxant - water - substituted phenylenediamine mixture at 60–65° C.

When only one methyl group is to be introduced as either A or B, one mole of dimethyl sulfate should be employed for each mole of substituted phenylenediamine (only one methyl radical of the dimethyl sulfate is available for alkylation of the nitrogen, as exemplified by the following equation:

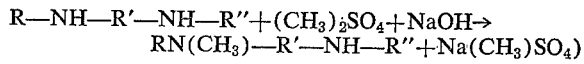

When two methyl groups are to be introduced, i.e., one on each nitrogen of the substituted phenylenediamine, two mole weights of dimethyl sulfate are employed per mole weight of diamine derivative. After additions are completed (about 2 hrs.) the mixture is heated for about one hour and the methylated products may be recovered by the following steps: (1) removal of water or water-dioxane by distillation, (2) separation by decantation, filtration, and the like, of the oil layer or solid material, as the case may be, from the remaining water solution, (3) distillation, or crystallization from a solvent such as isopropanol, benzene, or the like.

Instead of dimethyl sulfate, a methyl halide, e.g., chloride bromide or iodide may be employed to alkylate the substituted p-phenylenediamine derivative. For example methyl iodide, aqueous sodium carbonate and the parent phenylenediamine compound suspended therein are refluxed to disappearance of the methyl iodide, the mixture is made strongly alkaline, extracted with ether, benzene, or the like and the extract dried over NaOH pellets, and distilled to yield the desired methylated product. There are other practical methods of preparation, and the described methods are mentioned as illustrative only.

The introduction of the halogenoid groups as either of A or B or as R (in Category VI) is effected via reactions well known to the art. Thus the parent mono- and di-substituted p-phenylenediamines are readily reacted with (1) nitrous acid, (2) fatty acid, fatty acid chlorides, or esters of fatty acids, (3) the cyanohydrins of aldehydes and ketones (e.g., lactonitrile, hydrocarbon-substituted lactonitriles such as mandelonitrile, cyanohydrins of cyclohexanone, acetophenone, etc.) or (4) poly(cyanoalkyl) polyalkylenepolyamines such as penta(cyanoethy) - diethylenetriamine, hexa(cyanoethyl) - triethylenetetramine, hepta(cyanoethyl) - tetraethylenepentamine, to introduce the desired groups. The reaction of R—NHR'—NH—R" with a poly(cyanoalkyl) polyalkylenepolyamine is illustrated by the reaction of N,N'-di-2-octyl - p - phenylenediamine with penta(cyanoethyl)-diethylenetriamine of Dr. Jennen's said copending U.S. application S.N. 556,432.

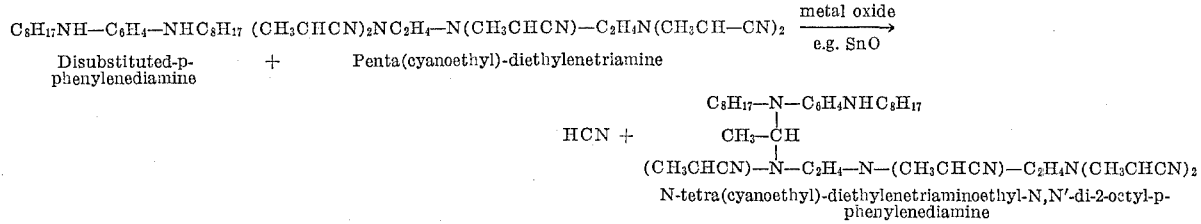

$C_8H_{17}NH—C_6H_4—NHC_8H_{17}$ $(CH_3CHCN)_2NC_2H_4—N(CH_3CHCN)—C_2H_4N(CH_3CH—CN)_2$ $\xrightarrow{\text{metal oxide}}_{\text{e.g. SnO}}$ Disubstituted-p-phenylenediamine + Penta(cyanoethyl)-diethylenetriamine $C_8H_{17}—N—C_6H_4NHC_8H_{17}$
HCN + $CH_3—CH$
$(CH_3CHCN)—N—C_2H_4—N—(CH_3CHCN)—C_2H_4N(CH_3CHCN)_2$ N-tetra(cyanoethyl)-diethylenetriaminoethyl-N,N'-di-2-octyl-p-phenylenediamine While this reaction mechanism has not been conclusively demonstrated, the reaction product of one mole of a poly-(cyanoalkyl) polyalkylene polyamine with one mole of disubstituted phenylenediamine in the presence of a trace of metal oxide is found reproducible and unique and possessive of antiozonant properties (Examples B–1 and E–2).

Where only one of A or B is to be so substituted (Categories B-I to -V) one mole of substituted diamine is reacted with one mole of reactant (1), (2), (3) or (4). When two or three groups (one or both of A and B, and these with R) are to be substituted one or two mole of the parent substituted diamine is reacted with two moles of (1), (2), (3) or (4), respectively, or a combination of any two thereof. For example, appropriate solvents for effecting these reactions are: water for nitrous acid; and benzene, if desired, for the cyanohydrin; no solvent being necessary for the fatty acids and their derivatives; or for the polycyanoalkylpolyamines. There are other practical methods of preparation, and the described methods are mentioned as illustrative only.

It has also been found that salts formed from dibasic acids and substituted p-phenylenediamine antiozonants of this invention, such as oxalates and maleates thereof, can be employed as antiozonants; conversion to such salts dilute the antiozone activity of the substituted diamines but serves to convert liquid antiozonants to a sometimes desired solid form and also serves to further retard the scorch tendency particularly of the N,N'-trisubstituted p-phenylenediamines of this invention.

It should be noted that, in the present invention (Table B, Categories III, V and VI) cyclohydrocarbon radicals are intended to include the heterocyclic and hydrocarbon substituted heterocyclic radicals, cycloalkyl and hydrocarbon substituted cycloalkyl radicals, and aryl and hydrocarbon substituted aryl radicals; likewise "hydrocarbon substituted" radicals R and R" in all categories of Table B are intended to include heterocyclic (e.g., pyridyl, pyrrolidinyl, pyrrolyl, pyrrolinyl, thienyl, furyl, and the like) substituted hydrocarbons.

GENERAL DESCRIPTION

The research has shown that the new compounds are valuable antiozonants for plastomers and resins as well as for natural and synthetic rubbers and are particularly useful antiozonants for tires and like natural and synthetic products subject to ozone attack at high operating temperatures, such as those temperatures attained by heavy duty truck tires, which temperatures may rise as high as 300° F. in use. Antiozonants are herein defined as additive agents which protect the polymeric material, e.g., natural and synthetic rubbers, against deterioration due to ozone attack. While serving as antiozonants, the new compounds also serve as antioxidants, e.g., the new products of this invention protect against deterioration of tensile properties caused by reaction of vulcanized rubber with oxygen. However, the new antiozonants must be used in larger amounts when used as the sole additive to protect against both oxygen and ozone. The specific class of new compounds of this invention differ from otherwise substituted materials of the class of substituted arylenediamines, in that the new compounds generally favorably effect scorch time and have less tendency to stain light colored stocks.

The new antiozonants comprising Part I of this invention comprises the N-methyl and N-$C_1$ to $C_4$ alkyl-N,N'-trihydrocarbon substituted-p-phenylenediamines, N-methyl and N-$C_1$ to $C_4$ alkyl-N,N'-dihydrocarbon substituted p-phenylenediamines, N-monohalogenoid-N,N'-trihydrocarbon radical and N-dihalogenoid-N'-dihydrocarbon radical-p-phenylenediamines, and N,N'-trihalogenoid-N'-monohydrocarbon-p-phenylenediamine falling in Categories I and VI set forth in Table B above. The term halogenoid denotes the halogenoid and organo-halogenoid substituents designated in Table B.

U.S. application S.N. 606,767 has disclosed that compounds represented by the formula R—NA—R'—NBR" are active antiozonants, in which formula R' is a mono- or di-phenylene nucleus, either A or B may be $C_2$ to $C_4$ alkyl when the other of A or B is $C_1$ to $C_4$ alkyl, hydrogen, halogenoid or organo-halogenoid (see Table A) while the present invention discloses that compounds represented by the same general formula are active antiozonants, in which either of A and B is methyl or $C_1$ to $C_4$ alkyl or in Categories V and VI may be a polar radical when the other of A and B are $C_1$ to $C_4$ alkyl or hydrogen or halogenoid or organo-halogenoid or acyl (Table B) and in which R" is a hydrocarbon radical, R is hydrocarbon, halogenoid or organo-halogenoid and the limitations are as shown in Table B.

Specific ranges of this class of materials of the categories of Table B are antiozonants when used alone in amounts of about 1 part or more per 100 parts of the high polymers to be protected and are claimed as such herein. The amounts employed for the mono-nitroso and mono-acyl derivatives of the p-phenylenediamines should be increased to some extent (Examples A–2, –3 and –4) because of the increase in molecular weight of the diamine resultant from conversion to said derivatives. The last statement does not apply to the other derivatives of this invention (e.g., Examples D–1, –2, B–1, –2, C–9 and –10).

Part II of this invention discloses synergistic combinations of the antiozonants of Part I hereof both with themselves and with antioxidants and/or waxes.

The antioxidants that show this synergistic effect with the above mentioned antiozonants are members of the following classes: amines and diamines; phenolics; hydroquinones and substituted hydroquinones; organic phosphites; aromatic esters; and thioamides.

The waxes found useful in developing synergistic antiozonant activity are the paraffin waxes and microcrystalline waxes and blends thereof.

This second part of the present invention thus comprises the discovery that highly active synergistic antiozonant compositions can be prepared from any of the antiozonants of Part I of this invention when used in lesser amounts than above stated, and even in amounts less than 1 part/100 parts of the high polymer to be protected, in combination with suitable proportions of known rubber antioxidants and/or certain thioamide antioxidants and/or waxes.

Further this invention includes the incorporation of the new antiozonants of Parts I and II of this invention into high polymeric materials and into latices thereof, and the ozone resistant products therefrom.

It has been disclosed in the aforesaid copending joint U.S. application that when N,N'-hydrocarbon substituents on the otherwise unsubstituted p-phenylenediamine contain less than 12 or more than 25 carbon atoms the virtual immunization against ozone is not obtained. It is the applicant's hypothesis that migration of the antiozonant is necessary to prevent ozone crack initiation at the air-rubber interface, and that the ability of the antioxidant to migrate is curtailed when the number of carbon atoms constituting the N,N'-substituents is in excess of about 25, and further that when the number of carbon atoms in such substituents is too small the additives migrate to the surface of the rubber compound and are lost by volatilization from heating or simple aging, and thus cannot protect the product. For effective antiozone activity the single factor of volatility cannot be considered by itself, since compatibility, migratability and volatility of the diamine antioxidant of this invention are important interdependent characteristics. Thus certain antiozonants show better protection after aging than before aging, which could not occur if volatility of the antiozonant were the sole determinant (e.g., several Group P examples of Table I). Regardless of the mechanism of protective action or the reasons therefore, it has been discovered by the present inventor that the compounds of the several categories of Table B, herein, in which the hydrocarbon substituents contain not less than 6 or more than 26 carbon atoms, and at least one of which substituents is a methyl group or a $C_1$ to $C_4$ alkyl group on one of the nitrogens, represents the class of compounds of this invention which are effective as antiozonants with low scorch and low staining characteristics.

To illustrate the observed critical nature of the number of carbon atoms in the alkyl substituents, and to show how such observed data fits the above hypothesis, there is presented herewith a diagram (FIGURE 1) showing the virtual immunity (measured by the "A value" procedure herein explained) of GR–S 1500 type synthetic rubber protected from ozone cracking by 5 parts of antiozonants of Categories I and III of Table B, represented by RAN—R'—NBR" wherein R' is a phenylene nucleus and when the number of carbon atoms in R+R"+A+B of the formula is at least 6 and not more than 25, i.e., the limits of total carbons of substituents on the phenylenediamine per Table B limitations of 12-31 for said two categories wherein 6 carbons are included for the nucleus. In this diagram an "A value" of 50 or less represents virtual immunity from ozone attack; while at an "A value" above 500, the samples are not considered an improvement over the usual Santoflex AW antioxidant control compound simultaneously exposed to ozone during the period of dynamic testing. When "A values" are obtained that lie from about 50 to about 500 the specimens show an improvement in relation to the data on crack depth for the control compound, i.e., the antiozonants show relative effectiveness for ozone protection in the range above virtual immunity but still better than the control. The line "X" represents the loss of immunity to ozone attack after aging when the antiozonant is lost by migration to the elastomer surface and volatilization; the line "Y" represents the loss of immunity to ozone attack when the ability of the antiozonant to migrate to the surface is inadequate.

Diagrams similar to FIGURE 1 may be drawn for the antiozonants of Categories II, IV, V and VI of Table B and also of Categories I and II of Table B in which R' is a diphenylene nucleus. Since FIGURE 1 is typical and illustrative of the nature of such diagrams, and of the carbon limits set forth in Table B for protection of dynamic goods thereby, such further diagrams are omitter herein in the interest of brevity.

FURTHER GENERAL DESCRIPTION

In the first part of the invention of the aforesaid joint U.S. application it is shown that an N-aryl-N'-cycloalkyl-p-phenylenediamine (with or without hydrocarbon substituents on its ring structures), when incorporated into elastomer compounds in amounts exceeding 3 parts per hundred of elastomer, effects protection against ozone cracking. N - phenyl - N' - 1 - methylcyclohexyl - p-phenylenediamine is an example of such a parent substituted diamine antiozonant, methyl derivatives of which as indicated in Table B, have now been discovered to be antiozonants. As shown in FIGURES 2 and 2A of said joint application, 3 parts of such parent antiozonant per 100 of elastomer show fair protection against ozone while virtual immunity is obtained with about 3.5 parts/100 of elastomer and 0.5 part wax, when no antioxidants are present. With 1.5 parts wax, 3 parts of said antiozonant gives virtual immunity to ozone attack.

In said S.N. 606,767 now U.S. Patent No. 3,157,615 it has been disclosed that the substituted antiozonants of Table A herein, behave in a manner similar to parent antiozonants when used in combination with antioxidants and/or waxes. This was unexpected and unpredictable in view of the diluent effect of substituent groups on the parent diamine. It has now been found that N-methyl stituted N - aryl - N' - cycloalkyl - p - phenylenediamines are likewise active antiozonants with added advantages of improved scorch and staining properties in comparison to the parent diamines. FIGURE 2 is a chart drawn for three of the new antiozonants of Table B, demonstrating antiozonant protection of GR–S in the presence of antioxidants added at the polymer plant. Since FIGURE 2 is representative, further charts are unnecessary to an understanding of this part of the present invention, applying to N-methyl and N-$C_1$ to $C_4$ alkyl-N,N'-dihydrocarbon and -trihydrocarbon-p-phenylenediamine, as well as the polar substituted diamines designated in Table B, and hence have been omitted for brevity.

With the small amount of antioxidant (such as 1.25 parts phenyl-beta-naphthylamine) that is ordinarily incorporated at the rubber manufacturing plants, substantially the same quantities of the antiozonant are required to obtain virtual immunity from ozone attack. However, the present research has shown that with larger quantities of antioxidants present, or with certain quantities of waxes that per se have no appreciable antiozonant effect, a synergism is developed and lesser quantities of the antiozonants will then give virtual immunity to ozone attack, as demonstrated in FIGURES 3 and 4. The synergism of metal salts in combination with the antiozonants of the first part of this invention is disclosed in the third part of said copending joint application which shows that protection against ozone attack may be obtained with as little as 0.5 part of the antiozonant material, so used.

The amounts of synergistic rubber antioxidants and/or waxes used in these synergistic combinations of Part II of this invention may vary with the specific antioxidant and/or wax, but in general are in the range of 0.5 to 5.0 parts/100 parts of elastomer (see FIGURES 3 and 4 demonstrating synergism with an antiozonant of Table B herein in Hycar 1014 and GR–S 1500, respectively). Expressed in terms of the proportions of the synergistic composition, such composition thus may comprise from 1 to 9 parts of antiozonant for rubber according to Table B, from 0 to 9 parts of antioxidant for rubber, and from 0 to 9 parts wax, per 10 parts of the synergistic composition.

The amine type antioxidants which, in combination with the above substituted phenylenediamines, produce good antiozonant compositions for elastomers and elastomer combinations, as above noted, include conventionally used amine antioxidants, amine-carbonyl-condensation products, tetrahydroquinoline derivatives and the like. More specifically the antioxidants tested for forming synergistic antiozonant combinations with the appropriately substituted phenylenediamines are set forth in Table C below; the synergistic waxes include paraffin and microcrystalline waxes and blends thereof.

The new antiozonants and/or the synergistic antioxidants and/or waxes can be appropriately incorporated (e.g., per se if liquid, or as an emulsion if solid) into the elastomer. For example, they may be added to the elastomer latex so that the final coagulated elastomer composition contains the desired antiozonants or components of the synergistic antiozonant compositions of this invention, whichever is desired. The elastomer latex may then be coagulated either in the conventional procedures, such as with salt-acid, glue, alum, etc., or with tin and/or iron group salts as described in Part III of said copending joint U.S. application, when the advantages thereof are desired.

The new antiozonants of this invention and their combinations for combining with elastomers at the elastomer production plant can be dissolved in an appropriate solvent as, for example, a hydrocarbon solvent like pentane, hexane, rubber solvent, etc.; an aromatic solvent like benzene, hexane, etc.; a ketone like acetone, diethyl ketone, ethylmethyl ketone, etc.; an alcohol like methanol, ethanol, isopropanol, etc. Thus, solutions of the new antiozonants can be proportionately added to the elastomer latex, the coagulated elastomer crumb, or even during the filtering of the wet elastomer crumb, or to the crumb after filtration.

TABLE C.—ANTIOXIDANTS SHOWING SYNERGISM WITH ANTIOZONANTS

Amines 6-ethoxy-2,2,4-trimethyl-1,2-dihydroquinoline (Santoflex AW)
2,2,4-trimethyl-1,2-dihydroquinoline polymer (AgeRite Resin D)
Diphenylamine-acetone condensation products (BLE-25) (Flectol H) [1]
Phenyl-beta-naphthylamine (PBNA)
Phenyl-alpha-naphthylamine (PANA) (Neozone A)
Aniline-acetone condensation products [1]
Aniline-butyraldehyde condensation products [2]
Di-alpha-naphthylamine
Di-beta-naphthylamine
Phenylenediamine (o-, m-, and p-forms)
p,p'-Diaminodiphenylmethane (Tonox)
p-Aminodiphenylamine
1,2-dianilinoethane (diphenylethylenediamine)
o-Tolidine
N,N'-diphenyl-p-phenylenediamine (Perflectol X)
Naphthylenediamine
Di-p-methoxydiphenylamine (Thermoflex)
N,N'-di-sec-butyl-p-phenylenediamine (Tenamene 2)
N,N'-di-beta-naphthyl-p-phenylenediamine (AgeRite White)
N,N'-di-beta-ac-tetrahydronaphthyl-p-phenylenediamine
N,N'-di-alpha-naphthyl-p-phenylenediamine
Tetraethylenepentaminopropionitrile
Mixture of isopropoxydiphenylamine, diphenylphenylenediamine and phenyl-beta-naphthylamine (AgeRite Hipar)
Rosinamine D [3]
Dodecylamine
N,N'-tetramethyl-p,p'-di(aminophenyl)methane
N-dimethyl-p-phenylenediamine
Polycyanohydrocarbonpolyamines of U.S. Ser. No. 556,432, filed Dec. 30, 1955 [4]

Phenolic

Parazone (p-phenyl phenol)
Santovar O (2,5-di-tert-butyl hydroquinone)
Hydroquinone Antioxidant 2246 (a p,p'-bisphenol, namely, 2,2'-methylene-bis(6-tert-butyl-p-cresol) produced by American Cyanamid Company)
Santowhite Flakes (a dibutyl-phenol sulfide, namely, 4,4'-thio-bis(6-tert-butyl-m-cresol) produced by Monsanto Chemical Co.)
Santovar A (2,5-di-tert-amylhydroquinone)

Phosphites

Triphenyl phosphite
Tri(nonylphenyl) phosphite (Polygard)

Aromatic esters

Glycerol monosalicylate ester
Dipropylene glycol monosalicylate ester

Thioamides

Thioacetanilide
Thiocarbanilide
Thioacetamide
Dibenzylthiourea
Phenylacetothiomorpholide

[1] See "College Outline Series—Organic Chemistry" by Degering, Barnes & Noble, Inc., New York, 1951, page 268.
[2] These aniline butyraldehyde condensation products are commercial products marketed as "Beutene" (Nangatuck Chemical Co.), "Antox," and "Accelerator 808" (Du Pont Chemical Co.), and "A-32" (Monsanto Chemical Co.), see also footnote 1, above.
[3] Trade name for technical grade dehydroabietylamine, see Condensed Chemical Dictionary, Reinhold Publ. Corp., N.Y. (1956), page 950.
[4] Corresponding Belgian Patent No. 553,770; corresponding French Patent No. 1,170,742.

PREPARATION AND TESTING PROCEDURES

The procedure employed in compounding and testing the elastomer-amino-additive compositions for the examples of Tables I, IA, II and IIA herein was as follows: as control samples "cold" GR-S synthetic rubber (GR-S 1500 a copolymer of over 50 percent, specifically about 76.5% butadiene and under 50%, specifically about 23.5%, styrene, by weight polymerized at 41° F. or GR-S 1600 which is the same except that 50 parts HAF carbon black are incorporated at the polymer plant, see G. S. Whitby, Synthetic Rubber, John Wiley & Sons, Inc., and Chapman & Hall, New York and London (1954), pages 220–222 and 373–374), Neoprene WHV, Hycar 1014, butyl and natural rubber were compounded and vulcanized according to best known commercial practices to obtain good aging properties. Then similar compounds were prepared and vulcanized with our new antiozonants present as additives. The recipes employed for the several elastomer compounds are in the following table.

In certain cases other waxes were substituted for the Atlantic 1115 of the formulae below. For example Sunproof, Heliozone and Witco 127 were found to be effective but not entirely equivalent in synergistic activity in combination with the antiozonants of the present invention.

For neoprene and butyl rubber the plastization required for low temperature performance results in nullifying a mapor portion of the inherent ozone resistance of the polymer itself, and according the antiozonants of the present invention are useful in such neoprene and butyl stocks.

These various elastomer samples were cured at about 1000 p.s.i. in a steam heated press at 285° F. with curing times adjusted in the range from 30 to 120 minutes, as required to obtain optimum tensile properties for each specific compound. Samples of each of the cured stocks were heat-aged for 24 to 48 hours at 100° C. and were then subjected to ozone exposures in both dynamic and static tests. The aging procedure employed was the test tube method designated as ASTM Method D-865-54-T.

The examples in the tables herein are limited to sulfur-cured vulcanizates; however, sulfurless curing systems, for

| Elastomer (100 parts) | Neoprene Type WHV | Nitrile Rubber- Hycar 1014 | Natural Rubber | Butyl GR-I-17 | GR-S (Cold) |
|---|---|---|---|---|---|
| Ingredients: [a] | | | | | |
| Philblack "O" (carbon black) | | | | | 50 |
| Thermax (carbon black) | 150 | | | | |
| Statex 125 (carbon black) | | 40 | | | |
| Micronex W-6 (carbon black) | | | 50 | 65 | |
| Zinc oxide | 5.0 | 3.0 | 3.0 | 5.0 | 3.0 |
| Stearic acid | 0.5 | 1.0 | 2.5 | 3.0 | 1.5 |
| PBNA | | | 1.0 | | |
| BLE-25 | | 1.5 | | | |
| Neozone A | 2.0 | | | | |
| Medium Pine Tar | | | 4.0 | | |
| TP-90B (plasticizer) [b] | | 16.0 | | | |
| Dioctylphthalate (plasticizer) | 30.0 | | | | |
| ParaFlux 2016 [c] | | | | | 3.5 |
| Circo Light Oil (Sun Oil Co.) | | | | 20 | 3.5 |
| Atlantic 1115 wax | 0-1.5 | 0-1.5 | 0-1.5 | 0-3.0 | 0-3.0 |
| Light Calcined MgO | 4.0 | | | | |
| Altax [d] | 0.5 | 1.5 | 1.0 | 0.5 | |
| Monex [e] | 0.5 | | | | |
| Methyl Tuads [f] | | | | 1.0 | |
| Santocure [g] | | | | | 1.25 |
| Sulfur | 0.5 | 1.5 | 2.5 | 2.0 | 2.0 |
| Antiozonant and other additive | | As shown | | | |

[a] Curing ingredients described in "Compounding Ingredients for Rubber," 2nd edition, published by India Rubber World, 1947.
[b] High molecular weight polyether sold by Thiokol Corporation.
[c] Saturated polymerized hydrocarbon sold by C.P. Hall Company.
[d] Benzothiazyl disulfide.
[e] Tetramethyl thiuram monosulfide.
[f] Tetramethyl thiuram disulfide.
[g] N-cyclohexyl-2-benzothiazole sulfenamide.

example with tetramethylthiuram disulfide, peroxide curing systems such as with dicumyl peroxide, benzoquinone dioxime, radiation curing systems, metal oxide curing of acid elastomers as for example zinc oxide and butadiene-acrylic acid copolymers and other curing systems can be used effectively with elastomers containing the antiozonants and synergistic antiozonant compositions.

The dynamic ozone test was conducted on ½-inch dumbbell specimens of the vulcanizates. The exposure to ozone was carried out in an aluminum-lined ozone cabinet where the concentration of ozone was usually held at 50±5 p.p.h.m. of air by passing 6 volumes of ozonized air/cabinet volume/minute. This high ozone concentration is used (25±5 p.p.h.m. is specified by ASTM test D–1149–51T) to demonstrate the protective effect of the antiozonants in a reasonably short time of evaluation and to approximate the atmospheric ozone concentrations reported at high altitudes attained by aircraft, and at ground level under certain climatic conditions in the Los Angeles area and parts of New Mexico and Alaska. Occasionally more highly accelerated ozone exposure tests were conducted by employing ozone concentrations as high as 150 p.p.h.m. With such high ozone concentrations much shorter times are required to obtain valid comparisons of the protective action of the additives under test (e.g., about 8 hrs.). Each sample was stretched and relaxed continuously at a rate of 30 times per minute, between 0 and 20% elongation on the total sample (0 to 28% on the narrow portion suffering the elongation) to simulate conditions of dynamic use of the rubber. After each test, usually of 40 to 70 hours' duration, a specimen taken from the center part of the narrow part of the dumbbell was placed under the microscope and the depth of the observed cracks was measured. The depths of the deeper 50% of the observed cracks were averaged, and this average was designated the "A value" and was taken as the index of ozone attack. With each group of 5 to 25 experimental samples control samples containing Santoflex AW were simultaneously subjected to the same dynamic ozone test, and the average crack depth "A value" was compared with the "A value" for the crack depths of the control samples as a basis of evaluation.

In the work on which this application and said copending application has been based, it has been demonstrated that where antiozone protection is obtained in the dynamic tests, protection is also afforded in static use. The static tests run on both heat-aged and unaged samples showed this to be true without exception. (The converse is not always true, e.g., some static protection is afforded by paraffin and microcrystalline waxes, which are valueless for protection of rubber articles subjected to dynamic usages.) Specimens for static testing were mounted in accordance with ASTM procedure D–518–44, Method B. The mounted samples were placed in the ozone exposure cabinet wherein the ozone concentration was held at a concentration of 25±5 p.p.h.m. or 50±5 p.p.h.m. at a temperature of 40° C. In this static test the samples were observed periodically and the time was measured to the appearance of the first crack. Since such static test data are merely confirmative of data obtained dynamically, static ozone exposure tests for the antiozonants of the present application are omitted herefrom for the sake of brevity. It suffices to state that long continued tests show that where virtual immunity against ozone was obtained with an antiozonant or a synergistic antiozonant composition in a 70-hour test at 25±5 p.p.h.m. of ozone or a 40-hour test at 50±5 p.p.h.m. of ozone, static protection up to one year was obtained at an ozone concentration of 25 p.p.h.m. without appearance of ozone cracks. The Santoflex AW controls showed severe cracking in the 70-hour test and failed in about 100 hours or less under the same static test conditions.

Similarly mounted panels of specimens (ASTM procedure D–518–44) were also statically tested in outdoor weather experiments in Florida (Miami), California (Los Angeles), and Michigan (Detroit). In California, where highest concentrations of ozone occurred over the time of the test (varied from 5 to 60 p.p.h.m. dependent on weather variations), up to six months of outdoor exposure were required to develop cracks (ASTM rating 4) in the samples containing antiozonants or synergistic antiozonant compositions. The Santoflex AW controls not only cracked but failed in a month under simultaneous exposure. In the Florida and Michigan tests the protected samples did not crack in a one-year test whereas the control samples not only cracked but failed in the same test. The rating method for the static exposure tests is shown by the following tabulation.

| Rating: | Development of static tests |
|---|---|
| 0 | No development of any kind. |
| 1 | Microscopic cracking. |
| 2 | Fine visible cracking. |
| 3 | Pronounced visible cracking. |
| 4 | Severe visible cracking. |

Scorch data were obtained according to ASTM Method D–1077–49T employing a Mooney viscometer. Scorch tendency indicates the tendency of the additives in a rubber compound to accelerate vulcanization of the compound during processing (e.g., during milling, extruding, etc.) prior to the conventional curing step. If an additive is too "scorchy" the compound cures to such a degree that it cannot be mold- or press-cured to intended useful end items. Scorchiness of certain antiozonants, although often corrected by use of cure retarders, low-sulfur and low-accelerator recipes, is a disadvantage in any type of rubber additive, and accordingly an ASTM method, already established to measure scorch, was employed to evaluate the antiozonants of the present invention with respect to scorchiness.

The scorch time is defined as the number of minutes required as measured from the start of the test, for the rubber compound to increase a specified number of points in viscosity (on a Mooney viscometer scale) above the minimum viscosity recorded when operating the Mooney viscometer at a fixed temperature selected preferably in the range of 250° to 300° F. In the present tests five points in viscosity was used as the specified number of viscosity points, and the temperature of test was set at 250° F.; these specifications were selected in accord with the most generally reported practice in the tire manufacturing industry. A 20 minute scorch time is considered a minimum for tire stocks with 22 to 25 minutes or more being preferred by industry.

Staining tendency of the antiozonants of this invention was measured in accordance with ASTM procedure D–1148–51T. The staining tendency of elastomer additives is important where light colored elastomer compounds are desired, e.g., for white sidewall tires, seals and gaskets for white enamel articles such as refrigerator doors, white instrument panels, etc. Thus, antiozonants should be non-staining signifying that they will not result in discoloration of white products which either incorporate the said antiozonants or are in contact with compounds incorporating them.

The method of measuring the tendency to discolor white articles was measured in this work by painting a compound containing the antiozonant with a white paint and exposing the sample to a sunlamp for 24 hours. The lamp, temperature of test, type of paint, rating of samples, etc., are as specified in said D–1148–51T. The ratings employed in both the staining and discoloring tests were as follows:

Very dark,
Dark,
Medium,
Light,
Very light.

The control (2 parts Santoflex AW in GR-S 1500) rated "dark." GR–S 1502 contains a non-staining antioxidant (e.g., tri(nonylphenyl)phosphite)) added at the polymer plant, and was used as the stock for measuring staining tendency of the new antiozonants.

SYNERGISM

In more detail, the second part of the present invention comprises the discoveries of antiozonant compositions which rely on the action of synergistic antioxidants, paraffin and/or microcrystalline waxes in combination with specific derivatives of p-phenylenediamines of the present invention in which there are one or more hydrocarbon substituents. When used in more than 3 parts per 100 parts of elastomer the said derivatives of p-phenylenediamine give virtual immunity to ozone attack per se. However, in combinations with certain antioxidants it has been found that reduced amounts (e.g., 0.5 to 3 parts) of the said specific p-phenylenediamine derivatives in combinations with 1.5 to 6 parts total of specific antioxidants serve to protect elastomers against ozone deterioration, although the antioxidants by themselves do not impart ozone resistance to the elastomer compounds, nor do the reduced amounts of said specific diamino derivatives alone (i.e., in the absence of the specific antioxidants) show adequate protection of the elastomer compounds. Such admixed and/or interacted components which develop antiozonant activity in protection of elastomers and plastomers are termed herein "synergistic compositions."

Thus I have made the discovery that certain antioxidants identified herein (see Table C) themselves incapable of protecting elastomers and plastomers against ozone, have the property of greatly increasing the effectiveness of reduced amounts of my specific antiozonants in elastomer and plastomer compositions. Such antioxidants I refer to herein as "synergists."

Still another alternative interpretation of my invention is that a small amount of diamino derivative, which itself can impart ozone resistance to elastomer and plastomer compositions incorporating said derivative in certain minimum amounts can develop antiozone activity in antioxidants when admixed therewith in less than such minimum amounts.

The mechanism of the action of such antioxidants in synergistic antiozonant composition is not entirely understood. One possible explanation is that the diamino antiozonants themselves may either react with certain of the rubber compound ingredients or may enter to some extent into the complex vulcanization reactions in the curing of the elastomer compositions, and that the synergistic antioxidant alters the degree to which the diamino antiozonant so enters the side reaction or vulcanization reaction. However, the exact mechanism is immaterial to the practice of the invention which the subsequently discussed data serve to exemplify.

It is also apparent that the wax component is an important component of some of the synergistic compositions. Thus virtual immunity resulted in an aged sample with 3 parts of the N,N'-dimethyl derivative of N,N'-diisopropyl-p-phenylenediamine antiozonant in Hycar 1014 with 1.5 parts BLE–25 and 0.5 part or more of wax (FIGURE 3); whereas with the same amounts of the antiozonant and BLE–25 but with no wax virtual immunity was not attained. Data showing the synergistic effect of wax with other antiozonants of the present invention while similar have been omitted for the sake of brevity.

I have found that while paraffin and microcrystalline wax and combinations thereof per se give some protection to static samples of vulcanized elastomers no protection is afforded vulcanized elastomers in dynamic usage. My findings confirm John O. Cole. In G. S. Whitby's treatise entitled "Synthetic Rubber," published in 1954 by John Wiley & Sons, Inc., New York, on page 541, Mr. Cole states, "It should be pointed out that, under dynamic flexing, wax offers no protection to either GR–S or natural rubber" (from the deterioration by ozone).

In contrast to this fact I have shown that waxes when used with the antiozonants of this invention can act synergistically, that is, can enhance the protection value of the antiozonants.

In addition to synergism demonstrated herein for antioxidant-antiozonant admixtures, it has also be found advantageous to combine two or more different antiozonants of this invention which lie in two or more of the categories of Table B of this invention or of Table A herein, taken from U.S. application S.N. 606,767, now U.S. Patent No. 3,157,615. For example, 1 part of N,N'-diisopropyl-N,N'-dimethyl-p-phenylenediamine combined with 2 parts of N,N'-tetraisobutyl-p-phenylenediamine shows unexpected improvements over either individual antiozonant in (1) protection of polymers against ozone, (2) anti-scorch tendency, (3) anti-staining tendency, and (4) age resistance (see Example O–37 in comparison with O–19 and O–24 (Table I), and also Table III).

OBSERVED RESULTS

Table I shows data for antiozonants of the several categories of Table B incorporated in GR–S 1500 samples subjected to the dynamic ozone exposure test. Table I-A shows analogous data for antiozonants of the several categories of Table A, including the data previously presented in said S.N. 606,767, now U.S. Patent No. 3,157,615. Table II contains examples of antiozonants of the several categories of Table B of this invention in other elastomers subjected to similar dynamic ozone tests while Table II-A shows analogous data for antiozonants of Table A, including the examples previously presented in said copending S.N. 606,767, now U.S. Patent No. 3,157,615. Because of the necessity of having separate controls for each group of samples tested, samples containing Santoflex AW were tested with each group of GR-S 1500 and natural rubber samples containing the amino compounds of the present invention to monitor the procedure and to give assurance that the several results were valid for evaluating the relative effectiveness of the several amino compounds for protection of GR-S and natural rubber against ozone attack.

Santoflex AW shows no protective action against ozone for Hycar, neoprene and butyl rubber and accordingly was not incorporated into the control compounds thereof.

Ortho- and meta-diamino aromatic compounds are relatively inactive as antiozonants as disclosed in said copending joint application, also certain compounds, such as phenyl-alpha-naphthylamine, di-beta-naphthylamine, hydronaphthylamine derivatives, although good antioxidants are not good antiozonants.

Certain compounds show some protection against ozone in comparison with Santoflex AW, e.g., N,N'-di-2-butyl-p-phenylenediamine, but after heat-aging protection against ozone is negligible. However, N-methyl substituted N,N'-di-2-butyl-p-phenylenediamine, both mono- and dimethyl, are active antiozonants which do not migrate and volatilize sufficiently during heat-aging to cause loss of antizone activity. It should also be called to attention that the GR-S 1500 examples of Tables I and I-A contained about 1.25 parts of either phenyl-beta-naphthylamine (PBNA) or a diphenylamine-acetone condensation product (BLE-25) in addition to the other additives shown. Also certain other compounds, particularly some of the parent diamines employed to prepare the antiozonants of this invention, show protection against ozone but cannot be used in most elastomers because their strong accelerating action on the vulcanization of elastomers results in scorchy stocks, e.g., primary amino compounds such as benzidine, 4-aminodiphenylamine, and N,N'-diisopropyl-p-phenylenediamine.

The ozone cracking in the case of the controls was greatly in excess of the 50 microns "A value" which represents virtual immunity to ozone attack, while the elastomers compounded with appropriate amounts of the new antiozonants of Table B are better than the controls and generally approach or are within the range of that criterium of "A value."

In comparative studies a few specific compositions of matter were discovered jointly by the applicant and R. G. Spain as disclosed in aforesaid copending application, which new compositions were more effective than Santoflex AW, and are represented by the formula

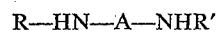

R—HN—A—NHR' in which A is p,p'-biphenylene, methylenediphenylene, or p,p'-iminodiphenylene and one or both of R and R' are alkyl groups containing 6 to 11 carbons. Derivatives of these parent antiozonants wherein the hydrogens of the just mentioned antiozonants are substituted as shown in the categories of Table B, are herewith disclosed to be antiozonants for protection of various elastomers.

Data for specimens prepared from "hot" GR-S (GR-S 1002) were very similar to those for "cold" GR-S set forth in Tables I and I-A and have therefrom been omitted for the sake of brevity.

Likewise parent di-sec-amines, which form new derivatives active an antiozonants as shown in Table B, are disclosed in copending U.S. applications by the present inventor (S.N. 607,318 and 610,819), such parent diamines being N-cyclohydrocarbon-N'-alkyl-p-phenylenediamines.

In similar compounds the antiozonants of the present invention shown in the six categories of Table B protect elastomers of various types against ozone.

Similarly, data for protected and unprotected polybutadiene, Philprene and BS/S/AA (butadiene/styrene/acrylic acid terpolymer), butyl rubber, neoprene, Hycar and natural rubber further demonstrate the extreme effectiveness of the new antiozonants, several of which are exemplified in Tables II and II-A.

It has been demonstrated that the addition of from 1 to 5 parts of the new antiozonants of this invention, Table B as well as of Table A of the invention of S.N. 606,767, now U.S. Patent No. 3,157,615 of which the present invention is a continuation-in-part, increases the time preceding appearance of the first ozone cracks in static samples as much as 1000-fold over the time of appearance of first cracks in synthetic rubber articles which have been prepared according to the best manner available prior to the discovery of the new antiozonants set forth herein as well as in the copending joint application. Data for the dynamic test of typical antiozonants of Table B are exemplified in FIGURE 2 for the range of 0 to 5 parts antiozonants.

FIGURE 3 exemplified wax synergism with the new antiozonants in Hycar 1014, and FIGURE 4 shows synergism obtained with other antioxidants in GR-S 1500 in combination with an antiozonant of this invention. While data of the same type shown in FIGURES 2 to 4 have been obtained for antiozonants of all categories of Table B in various synergistic elastomers, similar curves although not identical are omitted herein for the sake of brevity since they are merely confirmatory of the disclosures of FIGURES 2 to 4.

A series of elastomer compounds was prepared which conclusively establishes that the synergistic action with the antiozonants of PBNA (phenyl-beta-naphthylamine) and BLE-25 (acetone-diphenylamine condensation product) in the small quantities commonly introduced at the GR-S rubber plants is relatively insignificant, and that the data based on compositions including commercial GR-S afford a valid basis for evaluation of the antiozonants per se, as well as in synergistic combinations with other more active synergistic antioxidants and/or with significant quantities of PBNA and/or BLE-25.

In FIGURE 1 dynamic ozone exposure data are shown delineating the limitations on the carbon count of the hydrocarbon substituents "R+R" plus A and B," of the monophenylene nuclear antiozonants of Category III wherein R and R" are hydrocarbon groups as shown in Table B, and either of A and B is methyl and the other of A and B is hydrogen or a $C_1$ to $C_4$ alkyl group and also of Category I wherein R and R" are alkyl groups as shown and wherein either of A or B is $C_1$ to $C_4$ alkyl and the other of A and B is hydrogen or $C_1$ to $C_4$ alkyl group. Such curves are the bases for the limitations shown in the several categories of Table B. The interpretation of FIGURE 1 has been considered more fully hereinbefore.

In comparative studies limitations on carbon count were established for specific new compositions of matter of Categories I to VI, Table B, wherein R' is either a mono- or diphenylene nucleus, said new compositions being disclosed by the applicant to be effective antiozonants. For the sake of brevity analogous curves for such limitations as shown in Table B are omitted herefrom.

The new and useful compositions of matter of this invention include all the members of Table B herein except the members of Category I wherein R, R", A and B are identical primary alkyl groups containing from 1 to 3 (inclusive) carbon atoms.

For example, data for the present new antiozonants derived from further substitution of antiozonants of said copending joint application, said new antiozonants being represented by the formula R—NA—R'—NBR'', in which R' is a member of the group comprising p,p,'-biphenylene, p,p'-methylenediphenylene and p,p'-iminodiphenylene, and in which (1) both of R and R'' are alkyl groups or cyclohydrocarbon groups, or (2) R is alkyl and R'' is an aryl or a cycloalkyl group, and in which A and B are as shown in Table B, demonstrate that the limitations on carbon count of the substituted antiozonants are applicable as listed for the several categories of Table B. The new compounds of this invention are likewise restricted by the limitations of the several categories of Table B.

By cyclohydrocarbon substituents are meant heterocyclic, aryl and cycloalkyl groups, unsubstituted and hydrocarbon substituted; by cycloalkyl is meant any saturated cyclohydrocarbon radical ranging upward from $C_3$ radicals, e.g., cyclopropyl, cyclobutyl, cyclopentyl, cyclohexyl, cycloheptyl, cyclooctyl, etc. "Hydrocarbon substituted" is meant to include heterocyclic substituted as well as aliphatic, alicyclic and aromatic hydrocarbon substituted.

Finally the data for elastomer compounds show among other things, (1) how the minimum of the antiozone effective range of carbon atoms in the hydrocarbon substituent groups is effected when at least one substituent contains an aryl or cycloalkyl group, (2) the synergistic effect of antioxidants, and (3) the effectiveness of these diamine antiozonants even when one or both nitrogens are hydrocarbon disubstituted.

Examples 0–5 and –9 of Table I demonstrate that the antiozonants of this invention substituent radicals can replace both remaining hydrogens of the parent di-substituted-p-phenylenediamine antiozonant without detracting from the antiozonant activity of the latter, the higher molecular weight notwithstanding, and show the added advantages of decreased scorch and less staining tendency (Tables III and IV).

Examples 0–4, –7 and –8 of Table I also demonstrate developments of antiozone activity by introduction of substituent groups into an antioxidant (N,N'-diphenyl-p-phenylenediamine) 5 parts of which showed no adequate protection against ozone in GR-S 1500.

As mentioned under methods of test, data for static ozone tests and for outdoor weathering tests confirm the dynamic test results with regard to the antiozonant compositions of the present invention, but as such tests are less stringent than the dynamic test and as such data are only cumulative they have been omitted herefrom for brevity.

Table III herein exemplified improvement of the scorch time of the GR-S evaluation compound containing the new experimental antiozonants in comparison with control GR-S 1500 samples. Examples W-64 containing the parent diamine, N,N' - diisopropyl - p - phenylenediamine, showed a scorch time of 12 minutes. The dimethylated derivative of this compound, an antiozonant of this invention, in Example BB-29 showed 23 minutes scorch time. Likewise N,N'-di-cyclohexyl-p-phenylenediamine shows a scorch time of a marginal nature (20 minutes) but when methylated to produce an antiozonant of this invention, the more acceptable scorch time of 22 minutes was obtained. The improvement in scorch time, realized in every case for the new antiozonants of Table B in comparison with the parent N,N'-disubstituted diamines, is amply demonstrated by the data shown, and further data are omitted herefrom for the sake of brevity.

The improvement in staining tendency of the N-monosubstituted and N,N'-di-substituted derivatives (of the present invention) of the parent N,N'-dihydrocarbon substituted diamines is illustrated by the data of Table IV. As in the case of the scorch tendency, the N,N'-substituted derivatives (of the present invention) of the parent N,N'-dihydrocarbon substituted diamines in every case showed less stain than the parent compounds. The new compounds show light to very light stain or coloration whereas the parent compounds give dark to very dark coloration. The order of improvement is demonstrated amply by the data of Table IV so that further data are omitted herefrom in the interest of brevity.

Likewise the substituted p-phenylenediamine derivatives of this invention wherein from one to three substituents are polar and one is a hydrocarbon radical are exemplified in Table IV (see last six examples).

TABLE I.—GR-S 1500 CONTAINING ANTIOXIDANT ADDED AT THE POLYMER PLANT; WITH ANTIOZONANTS OF TABLE B HEREIN

[Accelerated dynamic exposure: ozone at 50±5 p.p.h.m.; 40° C.; 40 hrs. flexures/min.]

| Example | Sample | Pts. Additives | Pts. Wax | "A Value" Crack Depth (microns) | |
|---|---|---|---|---|---|
| | | | | Unaged | Aged 24 hrs. at 100° C. |
| Group O: | | | | | |
| 1 | S-9 Control | 2 Santoflex AW | 1.5 | 180 | 220 |
| 2 | O-80 | 3 N,N'-tetramethyl-methylene-bis dimethyl aniline (antioxidant) | 0 | 270 | 190 |
| 3 | O-81 | do | 1.5 | 225 | 140 |
| 4 | C-57 | 5 N,N'-diphenyl-p-phenylenediamine (antioxidant) | 0 | 200 | 220 |
| 5 | V-43-1 | 1.5 N,N'-dicyclohexyl-p-phenylenediamine | 1.5 | 210 | 270 |
| 6 | V-12 | 3 N,N'-dicyclohexyl-p-phenylenediamine | 0 | 100 | 90 |
| 7 | P-5 | 5 N,N'-dimethyl-N,N'-diphenyl-p-phenylenediamine | 0 | 50 | 0 |
| 8 | BB-55 | 3 N,N'-dimethyl-N,N'-diphenyl-p-phenylenediamine | 0 | 130 | 90 |
| 9 | BB-14 | 1.5 N,N'-dimethyl-N,N'-dicyclohexyl-p-phenylenediamine | 0 | 150 | 130 |
| 10 | BB-16 | 3 N,N'-dimethyl-N,N'-dicyclohexyl-p-phenylenediamine | 0 | 75 | 110 |
| 11 | BB-17 | do | 1.5 | 75 | 110 |
| 12 | BB-18 | 5 N,N'-dimethyl-N,N'-dicyclohexyl-p-phenylenediamine | 0 | 15 | 0 |
| 13 | V-22 | 5 N-cyclohexyl-N'-dimethyl-p-phenylenediamine | 0 | 0 | 0 |
| 14 | V-23 | do | 1.5 | 0 | 0 |
| 15 | V-24 | 5 N-2-octyl-N'-dimethyl-p-phenylenediamine | 0 | 0 | 0 |
| 16 | V-25 | do | 1.5 | 0 | 0 |
| 17 | V-32 | 5 N-phenyl-N'-dimethyl-p-phenylenediamine | 0 | 35 | 40 |
| 18 | V-10 | 5 N,N'-tetraisobutyl-p-phenylenediamine | 0 | 50 | 40 |
| 19 | BC-19 | 4 N,N'-tetraisobutyl-p-phenylenediamine | 0 | 100 | 95 |
| 20 | BB-26 | 1.5 N,N'-dimethyl-N,N'-diisopropyl-p-phenylenediamine | 0 | 50 | 65 |
| 21 | BB-28 | 3 N,N'-dimethyl-N,N'-diisopropyl-p-phenylenediamine | 0 | 35 | 25 |
| 22 | BB-29 | do | 1.5 | | 10 |
| 23 | BB-30 | 5 N,N'-dimethyl-N,N'diisopropyl-p-phenylenediamine | 0 | 15 | 10 |
| 24 | BB-46 | 1 N,N'-dimethyl-N,N'-diisopropyl-p-phenylenediamine | 1.5 | 230 | 200 |
| 25 | BB-48 | 3 N,N'-dimethyl-N,N'-diisopropyl-p-phenylenediamine | 1.5 | 75 | 45 |
| Group P: | | | | | |
| 1 | BB-49 | 1.5 N,N'-dimethyl-N,N'-diisopropyl-p-phenylenediamine+1.5 N,N'-tetramethyl-methylene bis-p-aniline. | 0 | 110 | 40 |
| 2 | BB-50 | do | 1.5 | 100 | 50 |
| 3 | BB-72 | 1.5 N,N'-dimethyl-N,N'-diisopropyl-p-phenylenediamine+3.0 N,N'-tetramethyl-methylene bis-p-aniline. | 0 | 50 | 30 |
| 4 | BB-51 | 1.5 N,N'-dimethyl-N,N'-diisopropyl-p-phenylenediamine+1.5 N,N'-tetramethyl-methylene bis-p-aniline. | 0 | 170 | 140 |

TABLE I—Continued

| Example | Sample | Pts. Additives | Pts. Wax | "A Value" Crack Depth (microns) Unaged | "A Value" Crack Depth (microns) Aged 24 hrs. at 100° C. |
|---|---|---|---|---|---|
| 5 | BB-12 | 5.0 N,N'-diisobutyl-N,N'-dicyclohexyl-p-phenylenediamine | 0 | 70 | 100 |
| 6 | BB-45 | (Control) | 1.5 | >600 | 510 |
| 7 | BA-43 | 3.0 N-mono-1-cyanoethyl-N,N'-diphenyl-p-phenylenediamine | 0 | | 85 |
| 8 | BA-55 | 3.0 N,N'-di-(1-cyanoethyl)-N,N'-diphenyl-p-phenylenediamine | 0 | | 100 |
| 9 | BB-73 | 3.0 N,N'-dimethyl-N-phenyl-N'-cyclohexyl-p-phenylenediamine | 0 | 150 | 130 |
| 10 | BB-74 | 3.0 N,N'-trimethyl-N'-phenyl-p-phenylenediamine | 0 | 130 | 110 |
| 11 | BB-75 | 3.0 N,N'-trimethyl-N'-cyclohexyl-p-phenylenediamine | 0 | 0 | 40 |
| 12 | BB-76 | 1.0 N,N'-diisopropyl-N,N'-dimethyl-p-phenylenediamine+2.0 N,N'-tetraisobutyl-p-phenylenediamine | 0 | 65 | 55 |
| 13 | BB-77 | 1.5 N,N'-diisopropyl-N,N'-dimethyl-p-phenylenediamine+1.5 N,N'-tetraisobutyl-p-phenylenediamine | 0 | 80 | 110 |
| 14 | BB-78 | 3.0 N,N'-trimethyl-N'-isopropyl-p-phenylenediamine | 0 | 65 | 120 |
| 15 | BB-79 | do | 1.5 | 90 | 100 |
| 16 | BC-20 | 1.33 N,N'-tetraisobutyl-p-phenylenediamine+0.67 N,N'-dimethyl-N,N'-diisopropyl-p-phenylenediamine | 0 | 160 | 130 |
| 17 | BC-21 | 2.67 N,N'-tetraisobutyl-p-phenylenediamine+1.33 N,N'-dimethyl-N,N'-diisopropyl-p-phenylenediamine | 0 | 55 | 65 |
| 18 | BC-22 | 1.0 N,N'-tetraisobutyl-p-phenylenediamine+1.0 N,N'-dimethyl-N,N'-diisopropyl-p-phenylenediamine | 0 | 85 | 150 |
| 19 | BC-23 | 2.0 N,N'-tetraisobutyl-p-phenylenediamine+2.0 N,N'-dimethyl-N,N'-diisopropyl-p-phenylenediamine | 0 | 50 | 150 |
| 20 | P-4 | 5.0 N,N'-di-2-octyl-N-methyl-p-phenylenediamine | 1.0 | 30 | 10 |

[1] For comparison with Examples P-1 to -4 demonstrating synergism.
[2] For comparison with Examples O-7 and -8, and P-7 and -8.
[3] For comparison with Examples O-9 to -12.

TABLE I-A.—GR-S 1500 CONTAINING ANTIOXIDANT ADDED AT THE POLYMER PLANT; WITH ANTIOZONANTS OF TABLE A HEREIN; WHEREIN A AND/OR B ARE ALKYL OR DESIGNATED POLAR GROUPS

[Accelerated dynamic ozone exposure test: ozone at 50±5 p.p.h.m.; 40° C.; 40 hrs.; 30 flexures per min. (includes and supplements data on antiozonants of S.N. 606,767.)]

| Example | Sample | Pts. Additive | Pts. Paraffin Wax | "A Value" Crack Depth (microns) Unaged | "A Value" Crack Depth (microns) Aged 24 hrs. at 100° C. |
|---|---|---|---|---|---|
| Group A: | | | | | |
| 1 | K-98[1] | 3.0 N,N'-di-2-octyl-p-phenylenediamine, Lot #6 | 1.5 | 85 | 140 |
| 2 | M-1 | 7.5 Monostearamide of N,N'-di-2-octyl-p-phenylenediamine | 1.5 | 30 | 40 |
| 3 | F-67[1] | 3.75 N,N'-di-2-octyl-p-phenylenediamine+3.5 stearic acid | 1.5 | 30 | 40 |
| 4 | K-27 | 3.0 N-nitroso-N,N'-di-2-octyl-p-phenylenediamine | 1.5 | 85 | 120 |
| 6 | J-00 | 6.0 Monooctanoamide of N,N'-di-2-octyl-p-phenylenediamine | 1.5 | 40 | 50 |
| 7 | Control | 13.0 Reaction product of 5 pts. N,N'-di-2-octyl-p-phenylenediamine and 8.55 pts. stearic acid (mole ratio 2/1). | 1.5 | 200 | 450 |
| 8 | Control | 2.0 Santoflex AW | 1.5 | 200 | 450 |
| 9 | BB-24 | 5.0 N,N'-diisobutyl-N,N'-diisopropyl-p-phenylenediamine | 0 | 100 | 55 |
| Group B: | | | | | |
| 1 | Q-81 | 5.0 Reaction product of SnO (0.30 mole); penta(cyanoethyl)-diethylene triamine (0.1 mole); N,N'-di(1-ethyl-3-methyl-pentyl)-p-phenylenediamine (0.13 mole); AgeRite Resin D (0.12 mole). | 0 | 40 | 40 |
| 2 | Q-82 | do | 1.5 | 30 | 60 |
| 3 | Control | 2.0 Santoflex AW | 1.5 | 190 | 310 |
| Group C: | | | | | |
| 6 | T-47 | 5.0 N,N'-di-2-butyl-N,N'-diisobutyl-p-phenylenediamine | 1.5 | | 150 |
| 8 | Control | 2.0 Santoflex AW | 1.5 | 200 | 270 |
| 9 | T-27 | 5.0 N-diethyl-N'-cyclohexyl-p-phenylenediamine | 0 | 0 | 50 |
| 10 | T-28 | do | 1.5 | 0 | 0 |
| Group D: | | | | | |
| 1 | S-94 | 5.0 N-Monocyanoethyl derivative of N,N'di-2-octyl-p-phenylenediamine | 0 | 30 | 65 |
| 2 | S-95 | do | 1.5 | 60 | 60 |
| 3 | Control | 2.0 Santoflex AW | 1.5 | 200 | 265 |
| 4 | S-96 | 5.0 N,N'-dicyanoethyl derivative of N,N'-di-2-octyl-p-phenylenediamine | 0 | 10 | 35 |
| 12 | T-13 | 5.0 N,N'-dicyanoethyl derivative of N,N'-di-2-butyl-p-phenylenediamine | 0 | 15 | 0 |
| 13 | F-25 | 5.0 N-monocyanoethyl derivative of N,N'-di-2-butyl-p-phenylenediamine | 1.0 | 20 | |
| 14 | F-26 | 5.0 N-monocyanoethyl derivative of N,N'-di-2-butyl-p-phenylenediamine+2 pts. monocyanoethyl tetraethylenepentamine. | 2.0 | 0 | |
| Group H: | | | | | |
| 1 | W-65 | 3.0 N-phenylcyanomethyl-N,N'-diisopropyl-p-phenylenediamine | 0 | 25 | 25 |
| 2 | W-71 | 3.0 N,N'-di(phenyl-cyanomethyl)-N,N'-diisopropyl-p-phenylenediamine | 0 | 30 | 35 |
| 3 | W-89 | 3.0 N-cyclohexylcyanomethyl-N,N'-diisopropyl-p-phenylenediamine | 0 | 0 | 40 |
| 4 | W-91 | 3.0 N,N'-di(cyclohexylcyanomethyl)-N,N'-diisopropyl-p-phenylenediamine | 0 | 80 | 150 |
| 5 | BA-23 | 3.0 N-1-cyanoethyl-N,N'-di-2-butyl-p-phenylenediamine | 0 | 65 | 110 |
| 6 | BA-25 | 3.0 N,N'-di-(1-cyanoethyl)-N,N'-di-2-butyl-p-phenylenediamine | 0 | 95 | |
| 7 | BA-27 | 3.0 N-1-cyanoethyl-N,N'-di-2-octyl-p-phenylenediamine | 0 | 15 | 120 |
| 8 | BA-21 | 3.0 N,N'-di(1-cyanoethyl)-N,N'-dicyclohexyl-p-phenylenediamine | 0 | 85 | |
| 9 | W-93 | 3.0 N-1-cyanoethyl-N,N'-dicyclohexyl-p-phenylenediamine | 0 | 45 | |
| 10 | BA-73 | 3.0 Monocyanoethyl-N-phenyl-N'-cyclohexyl-p-phenylenediamine | 0 | 25 | 30 |
| 11 | BB-53 | 3.0 N-cyclohexyl-N-1-cyanoethyl-N,N'-dimethyl-p-phenylenediamine | 0 | 15 | 120 |
| 12 | Control | 2.0 Santoflex AW | 1.5 | 175 | 400 |
| 13 | BA-78 | 3.0 N-phenyl-N'-isopropyl-N'-cyanoethyl-p-phenylenediamine | 1.5 | 100 | 100 |

[1] For comparison with other Group A examples.

TABLE II.—ELASTOMER COMPOUNDS (OTHER THAN GR-S) CONTAINING ANTIOXIDANT ADDED AT THE POLYMER PLANT (WHEN SYNTHETIC) AND CONTAINING ANTIOZONANTS OF TABLE B HEREIN

[Accelerated dynamic exposure test: Ozone at 50±5 p.p.h.m.; 40° C.; 40 hrs.; 30 flexes/min. (Neoprene contained 2 pts. Neozone A antioxidant; natural rubber contained 1 pt. PBNA antioxidant; Hycar contained 1.5 pts. BLE-25 antioxidant.)]

| Example | Sample | Elastomer | Pts. Additive | Pts. Wax | "A Value" Crack Depth (microns) | |
|---|---|---|---|---|---|---|
| | | | | | Unaged | Aged 24 hrs. at 100° C. |
| Group I: | | | | | | |
| 1 | Z-2 | Butyl | 5.0 N,N'-di-2-octyl-N-methyl-p-phenylenediamine | 0 | 0 | 0 |
| 2 | V-56 | do | 5.0 N-cyclohexyl-N,N'-dimethyl-p-phenylenediamine | 0 | 0 | 0 |
| 3 | V-57 | do | 5.0 N-phenyl-N,N'-dimethyl-p-phenylenediamine | 0 | 0 | 0 |
| 4 | Control | do | | 0 | 130 | 100 |
| Group J: | | | | | | |
| 1 | BA-95 | Nat. rubber | 3.0 N-cyclohexyl-N'-dimethyl-p-phenylenediamine | 0 | 30 | |
| 2[1] | BA-61 | do | 3.0 N,N'-diisopropyl-p-phenylenediamine | 0 | 45 | 110 |
| 3[1] | BA-62 | do | do | 1.5 | 40 | |
| 4 | BB-5 | do | 1.5 N,N'-diisopropyl-N,N'-dimethyl-p-phenylenediamine | 0 | 100 | 140 |
| 5 | BB-6 | do | 3.0 N,N'-diisopropyl-N,N'-dimethyl-p-phenylenediamine | 0 | 55 | 50 |
| 6 | BB-61 | do | do | 1.5 | 55 | 55 |
| 7 | BB-7 | do | 5.0 N,N'-diisopropyl-N,N'-dimethyl-p-phenylenediamine | 0 | 35 | 50 |
| 8 | BB-1 | do | 5.0 N,N'-dicyclohexyl-N,N'-dimethyl-p-phenylenediamine | 0 | 40 | 45 |
| 9 | Control | do | 5.0 Santoflex AW | 0 | 75 | 200 |
| 10 | BA-49 | do | 3.0 N,N'-diphenyl-N-mono(1-cyanoethyl)-p-phenylenediamine | 0 | 100 | 110 |
| 11 | BA-50 | do | do | 1.5 | 95 | 90 |
| 12 | BA-52 | do | 3.0 N,N'-diphenyl-N,N'-di(1-cyanoethyl)-p-phenylenediamine | 1.5 | | 120 |
| Group K: | | | | | | |
| 1 | BA-35 | Hycar 1014 | 3.0 N-monocyanoethyl-N,N'-diphenyl-p-phenylenediamine | 0 | 110 | 70 |
| 2 | BB-37 | do | 3.0 N,N'-diisopropyl-N,N'-dimethyl-p-phenylenediamine | 0 | 45 | 70 |
| 3 | BB-38 | do | do | 1.5 | 20 | 25 |
| 4 | BB-43 | do | 3.0 N,N'-dicyclohexyl-N,N'-dimethyl-p-phenylenediamine | 0 | 100 | 190 |
| 5 | Control | do | 1.5 BLE-25 Antioxidant | 1.5 | 700 | 600 |
| 6 | BC-4 | do | 3.0 N,N'-trimethyl-N-phenyl-p-phenylenediamine | 0 | 230 | 190 |
| 7 | BC-6 | do | 3.0 N,N'-trimethyl-N-cyclohexyl-p-phenylenediamine | 0 | 50 | 200 |
| 8 | BC-7 | do | do | 1.5 | 0 | 210 |
| 9 | BC-8 | do | 3.0 N,N'-trimethyl-N-isopropyl-p-phenylenediamine | 0 | 45 | 95 |
| 10 | BC-9 | do | do | 1.5 | 35 | 85 |
| 11 | BC-11 | do | 3.0 N,N'-tetraisobutyl-p-phenylenediamine | 1.5 | 50 | |
| 12 | BC-14 | do | 1.5 N,N'-tetraisobutyl-p-phenylenediamine+1.5 N,N'-dimethyl-N,N'-diisopropyl-p-phenylenediamine. | 0 | 90 | |
| 13 | BC-15 | do | do | 1.5 | 20 | |
| Group L: | | | | | | |
| 1 | W-55 | GR-S 1500 (100 pts.) + Neoprene (20 pts.). | 5.0 N-dimethyl-N'-cyclohexyl-p-phenylenediamine | 0 | 0 | 0 |
| 2 | W-56 | do | do | 1.5 | 0 | 0 |
| 3 | W-57 | do | 5.0 N-dimethyl-N'-2-octyl-p-phenylenediamine | 0 | 0 | 0 |
| 5 | W-58 | do | do | 1.5 | 0 | 0 |
| 5 | W-59 | do | 5.0 N,N'-di-2-octyl-N-methyl-p-phenylenediamine | 0 | 0 | 0 |
| 6 | W-60 | do | do | 1.5 | 0 | 0 |
| 7 | Control | do | None (contained 2 pts. antioxidant Neozone A) | 0 | 270 | 350 |
| Group M: | | | | | | |
| 1 | BA-94 | Nat. Rubber | 3.0 N-benzylidene-N'-dimethyl-p-phenylenediamine | 0 | | 130 |
| 2 | BA-92 | do | 3.0 N-phenyl-N,N'-trimethyl-p-phenylenediamine | 0 | | 140 |
| 3 | BB-94 | do | 3.0 N-cyclohexyl-N,N'-trimethyl-p-phenylenediamine | 0 | 50 | |
| 4 | BB-95 | do | do | 1.5 | 45 | |
| 5 | BB-96 | do | 3.0 N-isopropyl-N,N'-trimethyl-p-phenylenediamine | 0 | 35 | 150 |
| 6 | BB-98 | do | 3.0 N,N'-tetraisobutyl-p-phenylenediamine | 0 | 180 | 180 |
| 7 | BB-99 | do | do | 1.5 | 130 | |
| 8 | BB-100 | do | 3.0 N,N'-dimethyl-N,N'-diphenyl-p-phenylenediamine | 0 | 110 | 210 |
| 9 | BC-1 | do | do | 1.5 | | 140 |
| 10 | Control | do | 5.0 Santoflex AW | 0 | 75 | 210 |

[1] For comparison with Examples J-4 to J-7.

TABLE II-A.—ELASTOMERS OTHER THAN GR-S CONTAINING ANTIOXIDANTS ADDED AT POLYMER PLANT WITH ANTIOZONANTS OF TABLE A HEREIN WHEREIN A AND/OR B ARE CYANOALKYL OR CYANOALKYLAMINE RADICALS

[Accelerated dynamic ozone exposure test: Ozone at 50±5 p.p.h.m.; 40° C.; 40 hrs.; 30 flexures per min. (Includes data from S.N. 606,767)]

| Example | Elastomer | Code | Pts. Additives | Pts. Paraffin Wax | "A Value" Crack Depth (microns) | |
|---|---|---|---|---|---|---|
| | | | | | Unaged | Aged 24 hrs. at 100° C. |
| Group E: | | | | | | |
| 1 | Nat. rubber | Control | 5.0 Santoflex AW | 0 | 50 | 200 |
| 2 | do | Q-94 | 5.0 Reaction product of SnO(0.05 mole); penta (cyanoethyl)-di-ethylenetriamine (0.1 mole); N,N'-di-(1-ethyl-3-methyl pentyl)-p-phenylenediamine (0.13 mole); AgeRite Resin D (0.12 mole) | 0 | 10 | 115 |
| 3 | do | BA-63 | 3.0 Mono (phenylcyanomethyl)-N.N'-diisopropyl-p-phenylenediamine | 0 | 45 | 110 |
| 4 | do | BB-4 | 5.0 N,N'-diisopropyl-N,N'-diisopropyl-N,N'-diisobutyl-p-bhenylenediamine | 0 | | 55 |
| 5 | do | BA-98 | 5.0 N,N'-dicyclohexyl-N,N'-diisobutyl-p-phenylenediamine | 0 | | 110 |
| Group F: | | | | | | |
| 1 | Neoprene | Control | None | 0 | 280 | 340 |
| 2 | do | R-53 | 5.0 N-monocyanoethyl derivative of N,N'-di-2-octyl-p-octyl-p-phenylenediamine | 0 | 25 | 65 |
| 3 | do | R-54 | do | 1.5 | 0 | 0 |

TABLE II-A—Continued

| Example | Elastomer | Code | Pts. Additives | Pts. Paraffin Wax | "A Value" Crack Depth (microns) Unaged | "A Value" Crack Depth (microns) Aged 24 hrs. at 100° C. |
|---|---|---|---|---|---|---|
| Group G: | | | | | | |
| 1 | Hycar 1014 (nitrile rub.). | Control | 1.5 BLE-25 | 1.5 | >700 | >600 |
| 2 | do | T-81 | 5.0 N-monocyanoethyl-N,N'-cyclohexyl-p-phenylenediamine | 0 | 0 | 75 |
| 3 | do | BB-42 | 3.0 N,N'-dicyanoethyl-N-phenyl-N'-cyclohexyl-p-phenylenediamine | 1.5 | 90 | |
| 4 | do | BA-65 | 3.0 Monocyanoethyl-N-phenyl-N-cyclohexyl-p-phenylenediamine (cryst.) | 0 | 110 | 80 |
| 5 | do | T-82 | 5.0 N-monocyanoethyl-N,N'-di-2-octyl-p-phenylenediamine | 1.5 | 170 | 380 |
| 6 | do | T-85 | 5.0 Reaction product of 1 mole penta (cyanoethyl)-diethylene-triamine and 0.1 mole P₂S₅ | 0 | 170 | 340 |
| 7 | Butyl | Control | None | 0 | 130 | 100 |
| 8 | do | V-63 | 5.0 N-monocyanoethyl-N,N'-di-2-octyl-p-phenylenediamine | 0 | 80 | |
| Group N: | | | | | | |
| 1 | 65 pts. Hycar 1014, 35 pts. GR-S 1500 | W-18 | 5.0 N-monocyanoethyl-N,N'-di-2-octyl-p-phenylenediamine | 0 | 45 | 200 |
| 2 | do | W-19 | do | 1.5 | 0 | 40 |
| 3 | do | BA-11 | 3.0 N-1-cyanoethyl-N,N'-di-2-butyl-p-phenylenediamine | 0 | 140 | 270 |
| 4 | do | W-84 | 4.0 N-1-cyanoethyl-N,N'-diisopropyl-p-phenylenediamine | 1.5 | 140 | 460 |
| 5 | do | W-86 | 3.0 N,N'-di(1-cyanoethyl)-N,N'-diisopropyl-p-phenylenediamine | 1.5 | 170 | 360 |
| 6 | do | W-87 | 3.0 N-1-cyanoethyl-N,N'-dicyclohexyl-p-phenylenediamine | 0 | 170 | 210 |
| 7 | do | BA-10 | 3.0 N-1-cyanoethyl-N,N'-di-2-butyl-p-phenylenediamine | 1.5 | 130 | |
| 8 | Hycar 1014 | W-75 | 3.0 N-phenylcyanomethyl-N,N'-diisopropyl-p-phenylenediamine | 0 | 0 | 310 |
| 9 | do | W-81 | 3.0 N,N'-di(phenylcyanomethyl)-N,N'-diisopropyl-p-phenylenediamine | 1.5 | 0 | 130 |
| 10 | do | BB-41 | 3.0 N-phenyl-N'-cyclohexyl converted to monocyanoethyl derivative | 1.5 | 90 | 110 |
| 11 | do | BB-40 | 3.0 N-cyclohexyl-N-cyanoethyl-N,N'-dimethyl-p-phenylenediamine | 1.5 | 10 | |
| 12 | do | BB-39 | do | 0 | 75 | |
| Group Q: | | | | | | |
| 1 | Nat. rubber | W-98 | 3.0 N,N'-di(cyclohexylcyanomethyl)-N,N'-dicyclohexyl-p-phenylenediamine | 1.5 | | 130 |
| 2 | do | V-54 | 5.0 N-1-cyanoethyl-N,N'-di-2-butyl-p-phenylenediamine | 0 | 0 | 90 |
| 3 | do | Control | 5.0 Santoflex AW | 0 | 70 | 190 |
| 4 | do | BA-15 | 3.0 N-1-cyanoethyl-N,N'-di-2-butyl-p-phenylenediamine | 0 | 30 | 110 |
| 5 | do | BA-17 | 3.0 N,N'-di(1-cyanoethyl)-N,N'-di-2-butyl-p-phenylenediamine | 0 | 85 | 150 |
| 6 | do | BA-19 | 3.0 N-1-cyanoethyl-N,N'-di-2-octyl-p-phenylenediamine | 0 | 90 | 160 |
| 7 | do | BA-49 | 3.0 N-1-cyanoethyl-N,N'-diphenyl-p-phenylenediamine | 1.5 | 95 | 90 |
| 8 | do | Control | 5.0 Santoflex AW | 0 | 75 | 175 |

TABLE III.—ANTIOZONANTS OF TABLE B HEREIN
[Scorch times measured as minutes in Mooney viscometer at 250° F. to increase of 5 points in viscosity above the minimum viscosity ASTM Method D-1077-49-T]
GR-S 1500 Compounds With 1.5 Pts. Wax

| Sample | Pts. | Additives | Scorch Time, Min. |
|---|---|---|---|
| W-64 [1] | 3.0 | N,N'-diisopropyl-p-phenylenediamine | 12 |
| BB-29 | 3.0 | N,N'-diisopropyl-N,N'-dimethyl-p-phenylenediamine | 23 |
| BB-46 | 1.0 | do | 24 |
| BB-47 | 2.0 | do | 24 |
| BB-17 [1] | 3.0 | N,N'-dicyclohexyl-N,N'-dimethyl-p-phenylenediamine | 22 |
| T-45 [1] | 3.0 | N,N'-dicyclohexyl-p-phenylenediamine | 20 |
| BB-56 | 3.0 | N,N'-diphenyl-N,N'-dimethyl-p-phenylenediamine | 49 |
| BB-23 [2] | 3.0 | N,N'-diisopropyl-N,N'-diisobutyl-p-phenylenediamine | 44 |
| BB-11 [2] | 3.0 | N,N'-dicyclohexyl-N,N'-diisobutyl-p-phenylenediamine | 36 |
| BB-35 | 3.0 | N-dimethyl-N'-di(1-cyanoethyl)-p-phenylenediamine | 24 |
| BB-36 | 3.0 | N-dimethyl-N'-benzylidene-p-phenylenediamine | 24 |
| BB-90 | 3.0 | N,N'-tetraisobutyl-p-phenylenediamine | 34 |
| BA-74 | 3.0 | Monocyanoethyl derivative of N-phenyl-N'-cyclohexyl-p-phenylenediamine. | 48 |
| BB-85 | 3.0 | N-phenyl-N,N'-trimethyl-p-phenylenediamine | 39 |
| BB-87 | 2.0 | N,N'-tetraisobutyl-p-phenylenediamine + 1 pt. N,N'-dimethyl-N,N'-diisopropyl-p-phenylenediamine. | 28 |
| BB-88 | 1.5 | N,N'-tetraisobutyl-p-phenylenediamine + 1.5 pts. N,N'-dimethyl-N,N'-diisopropyl-p-phenylenediamine. | 26 |
| BC-24 | 3.0 | N-2-butyl-N,N'-tri(cyanoethyl)-p-phenylenediamine | 31 |
| BC-26 | 3.0 | N-phenyl-N,N'-tri(cyanoethyl)-p-phenylenediamine | |

Natural Rubber Compounds With 1.5 Pts. Wax

| Sample | Pts. | Additives | Scorch Time, Min. |
|---|---|---|---|
| BA-2 [1] | 3.0 | N,N'-di-2-octyl-p-phenylenediamine | 19 |
| BB-59 | 1.0 | N,N'-dimethyl-N,N'-diisopropyl-p-phenylenediamine | 22 |
| BC-1 | 1.0 | N,N'-diemthyl-N,N'-diisopropyl-p-phenylenediamine + 2.0 N,N'-tetraisobutyl-p-phenylenediamine. | 28 |
| BB-93 | 3.0 | N-phenyl-N,N'-trimethyl-p-phenylenediamine | 29 |
| BB-99 | 3.0 | N,N'-tetraisobutyl-p-phenylenediamine | 31 |
| BC-3 | 1.5 | N,N'-tetraisobutyl-p-phenylenediamine + 1.5 N,N'-dimethyl-N,N'-diisopropyl-p-phenylenediamine. | 22 |

[1] Control for comparison.
[2] Antiozonant of Table A for comparison.

TABLE IV.—STAINING CHARACTERISTICS OF ANTIOZONANT COMPOUNDS OF TABLE B HEREIN
[GR–S 1502 with 1.5 pts. paraffin wax ASTM Method D-1148-51-T]

| Sample | Pts. | Additive | Discoloration |
|---|---|---|---|
| W–44 Control | 2 | N,N'-dicyclohexyl-p-phenylenediamine | Dark. |
| P–3 | 2 | N-octyl-N'-dimethyl-p-phenylenediamine | Light. |
| BB–11[1] | 3 | N,N'-dicyclohexyl-N,N'-diisobutyl-p-phenylenediamine. | Very light. |
| BB–17 | 3 | N,N'-dicyclohexyl-N,N'-dimethyl-p-phenylenediamine. | Light. |
| BB–23[1] | 3 | N,N'-diisopropyl-N,N'-diisobutyl-p-phenylenediamine. | Do. |
| BB–29 | 3 | N,N'-diisopropyl-N,N'-dimethyl-p-phenylenediamine. | Do. |
| BB–56 | 3 | N,N'-diphenyl-N,N'-dimethyl-p-phenylenediamine. | Very light. |
| Control | 3 | N-phenyl-N'-cyclohexyl-p-phenylenediamine | Dark. |
| BB–73 | 3 | N,N'-dimethyl-N-phenyl-N'-cyclohexyl-p-phenylenediamine. | Light. |
| S–96[1] | 5 | N,N'-di-2-octyl-N,N'-di(1-cyanoethyl)-p-phenylenediamine. | Very light. |
| BB–90 | 3 | N,N'-tetraisobutyl-p-phenylenediamine | Do. |
| BA–74[1] | 3 | N-phenyl-N'-cyclohexyl-N'-cyanoethyl-p-phenylenediamine. | Do. |
| BB–35 | 3 | N-dimethyl-N'-dicyanoethyl-p-phenylenediamine | Do. |
| Control | 3 | N-phenyl-p-phenylenediamine | Very dark. |
| BC–30 | 3 | N-phenyl-N'-cyanoethyl-p-phenylenediamine | Medium. |
| BC–28 | 3 | N-phenyl-N'-di(cyanoethyl)-p-phenylenediamine | Light. |
| BC–26 | 3 | N-phenyl-N'-tri(cyanoethyl)-p-phenylenediamine | Very light. |
| BC–24 | 3 | N-Butyl-N,N'-tri(cyanoethyl)-p-phenylenediamine. | Do. |
| Control | 3 | N-butyl-p-phenylenediamine | Very dark. |

[1] Antiozonant of Table A for comparison.

FURTHER DISCUSSION OF RESULTS

Part I of this invention disclosed new antiozonants which per se in rubber containing insignificant amounts of antioxidants can protect elastomers against ozone cracking. Part II disclosed synergistic combinations of the antiozonants of Part I with antioxidants and/or waxes.

I have found that the quantity of antioxidant required to obtain the synergism varies with the antioxidants used. Most of the synergistic combinations of antiozonants of Part I of this invention in combination with antioxidants such as those examples of Table C contained at least one part PBNA (added at the GR–S polymerization plants) in addition to the added antioxidants.

From the data obtained in dynamic ozone tests it appeared that 11 of the antioxidants of Table C used only in 2 parts per 100 parts elastomer in combination with less than 3 parts antiozonants of Table B per 100 parts elastomer do not quite attain effective protection in GR–S 1500 compounds, viz:

BLE–25
Diphenylamine
PBNA
Rosinamine D
Flectol H
1-naphthylamine
Antioxidant 2246
Dipropylene glycol monosalicylate ester
Neozone A
Parazone
Polygard But it was noted from additional data that these 11 less actively synergistic antioxidants, when augmented by the 1.25 parts of antioxidant present in commercial GR–S, did give effective synergistic protection of the elastomer with less than 2 parts of antiozonant similar to the examples of FIGURE 4.

It is accordingly shown that to attain good synergistic activity with those less actively synergistic antioxidants, it is necessary to employ increased quantities thereof, or some other synergist therewith.

With respect to the antiozonants of this invention, the comment as regards the insignificance of less than 1.5 parts total of antioxidants (that show significant synergism when used in greater than such amount) apply. The fact that paraffin wax alone is a better synergist than microcrystalline wax has also been demonstrated. The data obtained with antiozonants of the present invention show the effectiveness of the antiozonant per se, and the synergism therewith of waxes. (See FIGURES 3 and 4.) In this connection, it will be noted that (1) the effectiveness of wax as a synergist is developed to a major extent at a wax content of about 1.5 parts wax with varying amounts of the antiozonant and (2) the improvement in the aged samples from the inclusion of wax with the antiozonant generally parallel those in the unaged samples.

It has been further demonstrated that the beneficial effect of wax in outdoor static tests is obtained. Thus in static usages even in the absence of synergistic antioxidants, the time to first cracking of GR–S samples containing 2.5 parts of antiozonants of the six categories of Table B can be appreciably increased by inclusion of 1.5 parts wax.

The categories of antiozonants of the present invention (Table B) are represented by the formula

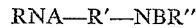

RNA—R'—NBR'' wherein R' is an arylene radical selected from the group comprising phenylene and diphenylene radicals and hydrocarbon substituted phenylene and diphenylene radicals, R'' is a hydrocarbon radical selected from the group comprising alkyl, cycloalkyl, and aryl according to the Categories I to VI; R for Categories I to V is a hydrocarbon radical as designated in Table B, and for Category VI is a polar halogenoid radical as designated in Table B; either of A or B may be hydrogen or $C_1$ to $C_4$ alkyl or a polar halogenoid radical as designated in Table B; the other of A or B is methyl according to Table B for Categories II to IV and $C_1$ to $C_4$ alkyl for Category I and $C_1$ to $C_4$ alkyl or a designated polar radical for Categories V and VI; and wherein the total number of carbon atoms in the hydrocarbon nucleus plus substituents for the six categories are 12 to 31 for Categories I and III, 12 to 23 for Category II, 13 to 31 for Category IV, 19 to 31 for Category V; and, 11 to 34 for Category VI.

Thus in the present invention a third and/or fourth substituent (A and/or B) may be present in the parent diamines (according to Table B) such as $C_1$–$C_4$ alkyl and/or methyl, or such as cyanoalkyl, nitroso, or poly(cyanoalkyl) polyamino radicals (examples of Tables I and II, and one of A and B may be acyl (Table I).

The data also demonstrate the application of the present invention to elastomers other than "hot" and "cold" GR–S. Natural rubber, polybutadiene, butadiene-methylvinylpyridine copolymer, butadiene-styrenemethacrylic acid copolymers and Hycar "N-rubber" have been successfully protected against ozone by synergistic antiozonant compositions of the present invention.

In summarizing the parts of this invention it has been demonstrated that: (1) antiozonants of Table B when used in from 1 to 5 parts in 100 parts elastomer protect the elastomer compound against ozone attack; (2) when the antiozonants of (1) are mutually combined or are combined with appropriate quantities of antioxidants of the several classes of as antioxidants and/or waxes, synergistic antiozonant compositions are formed wherein reduced amounts of antiozonants will serve to protect elastomer compositions.

The appropriate incorporation of the new antiozonant compositions, i.e., combinations of the substituted phenylenediamines with amino antioxidants, and/or waxes (and/or metal salts such as certain metal fatty acid salts of said copending joint application) gives virtual immunity against much higher than ordinary atmospheric concentrations of ozone, to elastomer compositions, even when the same have been subjected to radical heat-aging, thus showing that these antiozonant combinations are capable of protecting the products for long periods of time under dynamic as well as static conditions and at elevated temperatures.

The invention has further shown that when the total carbons of the compounds are kept within designated ranges the antiozonants are highly effective in aged stocks, it being thus shown that the ranges are critical for the protection of products subjected to high temperatures resulting from dynamic usage or otherwise, but may be broadened to some extent (e.g., a carbon count of say eight carbons less than the heat-aged ranges) and still be suitable for protection of static goods not subject to elevated temperatures or dynamic usages. New types of antiozonants have been prepared conforming to the general formula of Table B wherein A and/or B are specific phosphorus-containing radicals and wherein new advantages have been realized for the resulting product antiozonants. These are being investigated as part of a new invention of the present inventor.

With regard to the production of economical antiozonants of the present invention for elastomers, several octanones, benzaldehyde, cyclohexanone or acetophenone together with p-nitroso dimethylaniline and hydrogen serve as source materials for preparing, respectively, N-sec-octyl-N'-dimethyl-p-phenylenediamine, N-benzyl-N'-dimethyl-p-phenylenediamine, N-cyclohexyl-N'-dimethyl-p-phenylenediamine, and N-1-phenylethyl-N'-dimethyl-p-phenylenediamine, which are themselves antiozonants of Table B and also serve as parent compounds for preparation of further antiozonants of Table B herein. Comparison of the results attained, mutually and with the controls, shows that various synthetic elastomers are protected against ozone by incorporation of three to five parts of the antiozonants therein; and the same considerations show that natural rubber is similarly protected, as well as polyisoprene prepared synthetically by emulsion polymerization processes, by alkali metal polymerization (e.g., Coral rubber of Firestone Tire & Rubber Co.), by organo-metal alkali catalysts (e.g., the Alfin type of catalyst) or by metal alkyl catalysts (e.g., aluminum trialkyl, lead tetraethyl and combinations of organo-metallic compounds with metal salts).

In addition to the examples given in the tables, copolymers of styrene and butadiene were prepared which contained small amounts of copolymerized carbonyl-containing monomers such as methylvinyl ketone, crotonaldehyde or methylisopropenyl ketone and compounded with the antiozonants of this invention, and the results showed that these antiozonants are useful as additives for these carbonyl-containing elastomers.

These and other elastomers may be employed as additives, e.g., plasticizers for plastomer products, for which polar elastomers are usually selected. In such cases ozone deterioration of the elastomer component is prevented by the antiozonants of this invention.

The samples shown in the tables cover the principal types of elastomers, above described, but the range of polymers and combinations protected against ozone attack by the present antiozonants is not limited thereto, as similar protection has been obtained with plastomer compositions containing elastomers (e.g., butyl rubber, neoprene, polybutadiene, GR–S, acrylonitrile rubbers, etc.), which per se show less susceptibility to ozone attack.

Butyl rubber is known to be less susceptible to ozone attack than are GR–S elastomers. However, ozone cracking of butyl vulcanizates is an industrial problem for certain uses as evidenced by the study of D. C. Edwards and E. B. Storey, Transactions of the Institution of the Rubber Industry, pp. 45–69, vol. 31, No. 2, April 1955. I have found butyl rubber when plasticized with oils as commercially practiced to be considerably attacked by ozone. We have demonstrated that the antiozonants and synergistic antiozonant compositions of the present invention when appropriately compounded into butyl rubber are capable of protecting the resultant butyl vulcanizates against ozone attack. In like manner plasticized neoprene compounds are protected against ozone attack by appropriate use of antiozonants and antiozonant compositions of the present invention.

As also noted above, the elastomers used in the examples of the tables herein generally vulcanization, usually material capable of withstanding vulcanization, usually PBNA, but sometimes BLE–25. Such antioxidant materials afford no protection against ozone attack of the principal products, nor do they effectively enable the other antioxidants of Table C to do so. From the observed date, however, it is shown that in combination with the new antiozonants, the PBNA and other specific antioxidant materials have a synergistic effect enabling smaller quantities of the antiozonants of the present invention and of the specified invention of S.N. 606,767 to effectively protect the products against ozone attack.

Variations in compounding of the elastomers can nullify the protective action of these antiozonants. For example, high amounts of waxes, plasticizers (particularly petroleum oils containing unsaturates, such as ParaFux 2016), zinc stearate, rosin acids or stearic acid lower the effectiveness of our new additives in rubbers. Caution should be exercised by the compounder to avoid excessive amounts of such ingredients particularly where the elastomer is subjected to dynamic use.

In general from 1 to 5 parts of the new diamine antiozonant per 100 of rubber in the absence of added antioxidants is adequate for practice of the present invention in protection of statically employed items (prepared from natural and synthetic rubbers) for practical periods of time against deterioration due to ozone attack; 3 or more parts are preferred for elastomer items in dynamic usages. In synergistic combinations, however, from 0.5 to 3 parts of the substituted p-phenylenediamines, substituted benzidines, substituted bis(aminophenyl)amines, and substituted bis(4-aminophenyl)methanes of this invention are sufficient to provide ozone protection for the elastomer compounds for both static and dynamic usage.

The amount of antiozonant compositions containing synergistic antioxidants and/or waxes required to give ozone protection to elastomers varies with the type of antioxidants and metal salts (Part III of said copending joint invention) employed and depends at least in-part on whether the antioxidants and metal salts are used in combination or singly; in general for the practice of the present invention the total amount of synergistic additives varies from 1.25 to 6 parts per 100 of elastomer. Of course, the use of small amounts of waxes in rubber compounds together with antioxidants is recognized in the prior art. However, the appropriate combination of waxes with the antiozonants of the present invention, both with and without synergistic antioxidants to develop synergistic antiozonant compositions, constitutes an unforseeable and a valuable advance in the protection of elastomer and plastomer compositions against ozone cracking, in view of the fact that waxes were heretofore considered to be harmful for ozone resistance of elastomers in dynamic usage.

The antiozonants and synergistic antiozonant compositions of the present invention have also been found to be effective in protection against ozone cracking of plastomers which have residual unsaturation or active hydrogens such as may be present in methylene or methinyl groups. Thus resins or plastomer compositions comprising polymers and copolymers of vinylchloride, vinylacetate, alkyl-acrylates, etc., in combination with unsaturated polymer ingredients, are subject to attack by ozone, and such attack is avoided when the new antiozonants are present in such compositions.

It has further been demonstrated that the new antiozonants and synergistic antiozonant compositions can be compounded with the GR–S 1500 in the Banbury mixer, on the rubber mill, or by incorporation in the elastomer latices as above described either at the polymer plant or by the consumer at any time prior to coagulation and drying.

Also the substituted diamine antiozonants containing one amino hydrogen can be added as the mono-stearamide, oleamide, or other fatty acid amide, in accordance with the invention of said S.N. 606,767 now U.S. Patent No. 3,157,615 of which this is a continuation-in-part, as evidenced by experiments wherein fatty acid-antiozonant mixtures (1 mole acid/1 mole diamine) were compared with the mono-acid amide in GR–S compounds and equivalent ozone protection was afforded in the two cases (Examples A–2 and A–3, Table I of said copending application; shown herein as Examples A–2 and A–3 of Table I–A). Also, the additives of the present invention may be incorporated as salts of dibasic acids such as oxalic, maleic, and the like, without departing from the practice of this invention.

The research has shown that the new compounds are valuable antiozonants for plastomers and resins as well as for natural and synthetic rubbers and are particularly useful antiozonants for tires and similar natural and synthetic products (subject to ozone attack) which attain high operating temperatures, such as those temperatures attained by heavy duty truck tires, and such temperatures may even rise to 300° F. in use. Antiozonants are herein defined as additive agents which protect the polymeric material, e.g., natural and synthetic rubbers, against deterioration due to ozone attack. While serving as antiozonants the new compositions also serve as antioxidants, i.e., the new products of this invention protect against deterioration of tensile properties of rubber compounds due to attack by oxygen and sunlight. However, the antiozonants must not be too reactive with oxygen or they can too rapidly disappear from the compounds incorporating them and ozone protection will thereafter be absent. Similar to the said copending sole and joint applications, the present classes of compounds represented by

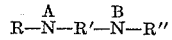

as well as each synergistic composition described herein is specific and differs in general from other amines such as diarylamines, arylenediamines, and their derivatives, and mixtures with other types of antioxidants in that other members of these general categories and their mixtures will not effectively protect against attack by ozone as is demonstrated by the research summarized hereinbefore and in S.N. 523,711.

These new antiozonant compositions have also been found effective in protection of elastomer dispersions such as latices of natural rubber, GR–S elastomers, Neoprene, acrylonitrile copolymeric elastomers, and the like which are to be used for coating and film-forming purposes, e.g., for paper coatings, wall paints, etc. By incorporation of the new antiozonant compositions in the latices together with the vulcanizing ingredients, the subsequently formed cured films therefrom are effectively protected against ozone cracking.

An "antiozonant composition" as used herein denotes any of the amine antiozonants represented by

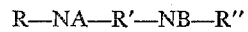

as herein defined, as well as each and every synergistic composition described in the preceding discussion whether containing one or more of each class of synergists described, i.e., waxes, certain metal salts, and the designated classes of antioxidants.

Herein the term elastomer is employed to designate an elastic polymer or macromolecule, whether a naturally-occurring material or a synthetic polymeric substance. Plastomer is defined as including both thermoset and thermoplastic high-molecular weight resinous and plastic materials. These definitions follow those used by Harry L. Fisher, Industrial and Engineering Chemistry, vol. 31, p. 942 (1939).

While there have been described herein what are at present considered preferred embodiments of the invention, will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

I claim:

1. A sulfur vulcanizable rubber composition normally subject to cracking containing, in sufficient amount to retard said cracking, N,N' - dimethyl-N,N'-di-isopropyl-p-phenylenediamine.

2. A sulfur vulcanizable rubber composition normally subject to cracking containing, in sufficient amount to retard said cracking, N-di-methyl-N'-phenyl-p-phenylenediamine.

3. Crosslinked butadiene-styrene rubber containing an antiozonant amount of N,N'-dimethyl-N,N'-di-sec-butyl-p-phenylenediamine.

4. The method of treating budadiene-styrene rubber which comprises crosslinking the same in the presence of an antiozonant amount of N,N'-dimethyl - N,N' - di - sec-butyl-p-phenylenediamine.

References Cited

UNITED STATES PATENTS

| | | | |
|---|---|---|---|
| 2,883,362 | 4/1959 | Rosenwald et al. | 260—45.9 |
| 3,019,211 | 1/1962 | Albert | 260—45.9 |
| 2,798,860 | 7/1957 | Hand et al. | 260—45.9 |
| 2,494,059 | 1/1950 | Ruggles | 260—576 |
| 2,562,802 | 7/1951 | Mankowich et al. | 260—576 |
| 2,759,905 | 8/1956 | Wood et al. | 260—45.9 |
| 2,788,338 | 4/1957 | Zerbe | 260—45.9 |

FOREIGN PATENTS

| | | |
|---|---|---|
| 508,129 | 6/1939 | Great Britain. |
| 728,509 | 4/1955 | Great Britain. |
| 837,635 | 2/1939 | France. |
| 851,775 | 1/1940 | France. |

DONALD E. CZAJA, Primary Examiner.

A. D. SULLIVAN, P. E. MANGAN, A. M. BOETTCHER, M. STERMAN, Examiners.

P. M. COUGHLAN, S. H. BLECH, H. E. TAYLOR, T. L. TULLY, Assistant Examiners.